United States Patent

Takeda et al.

[11] Patent Number: 5,845,057
[45] Date of Patent: Dec. 1, 1998

[54] PRINT PROCESSING METHOD FOR A PLURALITY OF PRINTING APPARATUSES CONNECTED TO A NETWORK

[75] Inventors: Yoshiko Takeda, Yokohama; Takeshi Ogaki; Shiro Takagi, both of Tokyo, all of Japan

[73] Assignee: Kabushiki Kaisha Toshiba, Kawasaki, Japan

[21] Appl. No.: 715,367

[22] Filed: Sep. 12, 1996

[30] Foreign Application Priority Data

Nov. 30, 1995 [JP] Japan .................................. 7-313302

[51] Int. Cl.$^6$ .............................. B41B 15/00; B41J 15/00; H04N 1/21
[52] U.S. Cl. ............................. 395/114; 395/113; 358/296
[58] Field of Search .................................. 395/101, 113, 395/114; 358/468, 296, 442

[56] References Cited

U.S. PATENT DOCUMENTS 5,625,757   4/1997   Kageyama et al. ..................... 395/114
5,696,894  12/1997   Ono ........................................ 395/114

FOREIGN PATENT DOCUMENTS 0 538 059   4/1993   European Pat. Off. .
44 22 619   1/1995   Germany .

Primary Examiner—Kim Yen Vu
Assistant Examiner—Kimberly A. Williams
Attorney, Agent, or Firm—Foley & Lardner

[57] ABSTRACT

Terminals, printing apparatus, and digital copying machines are connected to one network N. A document managing portion of the printing apparatus stores document data received through the network N to a document data storing portion, and generates managing data of document data so as to be stored in a document managing table. When an error processing portion detects the occurrence of an error with reference to a table during the printing of document data, an error processing portion determines the other printing apparatus for a substitutive printing with reference to various kinds of tables, and transmits document data. A report sheet issuing portion generates a report sheet image showing a name of a substitutive printing apparatus, a current state of the apparatus having an error, measures to remove the error, etc., and a printing portion prints the report sheet image.

11 Claims, 20 Drawing Sheets

PAPER HAS BEEN DEPLETED.

RESIDUAL DOCUMENTS HAVE BEEN PRINTED BY THE FOLLOWING APPARATUS.

RECEIVING DATE AND TIME : 95. 08. 08 16:30

TRANSFER DESTINATION : PRT1

SETTING LOCATION : 2F-A

NAME OF USER : USER 1

FIG. 8

PAPER HAS BEEN JAMMED.

RESIDUAL DOCUMENTS HAVE BEEN PRINTED BY THE FOLLOWING APPARATUS.

RECEIVING DATE AND TIME : 95. 08. 08 16:40

TRANSFER DESTINATION : PRT2

SETTING LOCATION : 2F-B

NAME OF USER : USER 1

FIG. 9

```
        STAPLER HAS EMPTIED.

THE PRINT OF THIS DOCUMENT IS
STOPPED NOW
RECEIVING DATA
AND TIME        :95.08.08 16:50
NAME OF USER    :USER 1

IF THE NEEDLES FOR STAPLER ARE
SUPPLIED, THE PRINTING IS
RESTARTED BY THIS APPARATUS.
ALSO, IF THE REPORT SHEET IS
INSERTED TO THE SCANNER OF ANY
OF THE FOLLOWING APPARATUS,
RESIDUAL DATA IS PRINTED.
```

| NAME OF APPARATUS | SETTING LOCATION |
|---|---|
| PRT1 | 2F-A |
| PRT2 | 2F-B |

F I G. 10

```
            CAUTION

THE PRINT OF THE DOCUMENT YOU
ASKED IS STARTED. HOWEVER,
PAPER IS LACKING DURING THE
PRINTING. SUPPLY PAPER AS SOON
AS POSSIBLE.

RECEIVING DATE
AND TIME       :95.08.08 17:00
NAME OF USER   :USER 1
```

F I G. 11

DOCUMENT MANAGING TABLE

| DOCUMENT ID | POINTER TO DOCUMENT DATA | RECEIVING DATE AND TIME | USER ADDRESS | NUMBER OF COPIES | NUMBER OF PAGES | PRINT COPY NUMBER | PRINT PAGE NUMBER | EXCUTION STATE | RELEASE CODE | TRANSFER DEVICE ID | PAPER SIZE | SUBSTITUTIVE PAPER SIZE |
|---|---|---|---|---|---|---|---|---|---|---|---|---|
| 1 | xxxx | 95.08.08 16:30 | USER1 | 2 | 5 | 2 | 3 | ERROR OCCURING | R001 | 1 | A4 | B4 |
| 2 | xoxx | 95.08.08 16:40 | USER2 | 1 | 10 | 1 | 5 | ERROR OCCURING | R002 | 2 | B5 | NULL |
| 3 | xxox | 95.08.08 16:50 | USER1 | 2 | 15 | 1 | 1 | WAITING | 0000 | 0 | A4 | NULL |
| 4 | xxxo | 95.08.08 17:00 | USER2 | 1 | 20 | 1 | 1 | WAITING | 0000 | 0 | A4 | B4 |

ERROR DETECTING TABLE 421

| CHECKING ITEMS | PERFORMING STATE | CAUTION VALUE | ERROR VALUE | CAUTION CODE | ERROR CODE | RELEASE CODE |
|---|---|---|---|---|---|---|
| NUMBER OF PAPER | 100 | $a$ NUMBER OF PAGES | 1 | W001 | E001 | R001 |
| PAPER JAM | 1 | | 0 | W002 | E002 | R002 |
| NUMBER OF NEEDLES FOR STAPLER | 50 | $a$ NUMBER OF COPIES | 0 | W003 | E003 | R003 |
| TONER CAPACITY | 20 | 10 | 5 | W004 | E004 | R004 |
| | | | | | | |

FIG. 13

ERROR PROCESSING DETERMINING TABLE 422

| CODE | PROCESSING CONTENT | SHEET ISSUING | SHEET ID | MESSAGE ID |
|---|---|---|---|---|
| E001 | SUBSTITUTIVE PRINTING | ISSUE | 1 | 0 |
| E002 | SUBSTITUTIVE PRINTING | NON-ISSUE | 0 | 0 |
| E003 | STOP PRONTING | ISSUE | 2 | 0 |
| E004 | SUBSTITUTIVE PRINTING | NON-ISSUE | 0 | 0 |
| W001 | NOTIFICATION TO USER | NON-ISSUE | 0 | 1 |
| W002 | NON-EXSTENCE | NON-ISSUE | 0 | 0 |
| W003 | NOTIFICATION TO USER | NON-ISSUE | 0 | 3 |
| W004 | NOTIFICATION TO USER | NON-ISSUE | 0 | 4 |
| R001 | DOCUMENT DELETION | NON-ISSUE | 0 | 0 |
| R002 | DOCUMENT DELETION | ISSUE | 3 | 0 |
| R003 | RESTART PRINTING | NON-ISSUE | 0 | 0 |
| R004 | NON-EXSTENCE | ISSUE | 4 | 0 |
|  |  |  |  |  |

FIG. 14

PRINT APPARATUS MANAGING TABLE 423

| APPARATUS ID | NAME OF APPARATUS | APPARATUS ADDRESS | SETTING LOCATION | PERFORMING STATE |
|---|---|---|---|---|
| 1 | PRT1 | 111.111.111.11 | 2F-A | WAITING |
| 2 | PRT2 | 222.222.222.22 | 2F-B | EXECUTING |
| 3 | PRT3 | 333.333.333.33 | 2F-C | ERROR OCCURING |
|  |  |  |  |  |

FIG. 15

MESSAGE MANAGING TABLE  /424

| MESSAGE ID | MESSAGE DATA |
|---|---|
| 1 | 'CAUTION ¥n THE POINT OF THE DOCUMENT YOU ASKED IS RESTARTED. HOWEVER, PAPER IS LACKING DURING THE PRINTING. SUPPLY PAPER AS SOON AS POSSIBLE. ¥n RECEIVING DATE AND TIME ¥t"@RECEIVING DATE AND TIME ¥n USER ¥n"@USER ADDRESS |
| 2 | |
| 3 | |
| 4 | |
| | |

F I G. 16

SHEET MANAGING TABLE  /425

| SHEET ID | POINTER TO SHEET PRINTING TABLE | DOCUMENT ID PRINTING |
|---|---|---|
| 1 | | NON-PRINTING |
| 2 | | PRINTING |
| 3 | | NON-PRINTING |
| | | |

F I G. 17

SHEET PRINTING TABLE   426

| PART ID | KINDS OF PARTS | PART DATA | PRINTING POSITION |
|---|---|---|---|
| 1 | CHARACTER STRING | "PAPER HAS BEEN DEPLETED" | 100, 100-800, 100 |
| 2 | CHARACTER STRING | "RESIDUAL DOCUMENTS HAVE BEEN PRINTED BY THE FOLLOWING APPARATUS" | 100, 400-800, 200 |
| 3 | CHARACTER STRING | "RECEIVING DATE AND TIME" | 200, 600-200, 100 |
| 4 | CHARACTER STRING | @RECEIVING DATE AND TIME | 500, 600-200, 100 |
| 5 | CHARACTER STRING | "TRANSFER DESTINATION" | 200, 700-200, 100 |
| 6 | CHARACTER STRING | @NAME OF APPARATUS | 500, 700-200, 100 |
| 7 | CHARACTER STRING | "SETTING LOCATION" | 200, 800-200, 100 |
| 8 | CHARACTER STRING | @SETTING LOCATION | 500, 800-200, 100 |
| 9 | CHARACTER STRING | "NAME OF USER" | 200, 900-200, 100 |
| 10 | CHARACTER STRING | @USER ADDRESS | 500, 900-200, 100 |
|  |  |  |  |

FIG. 18

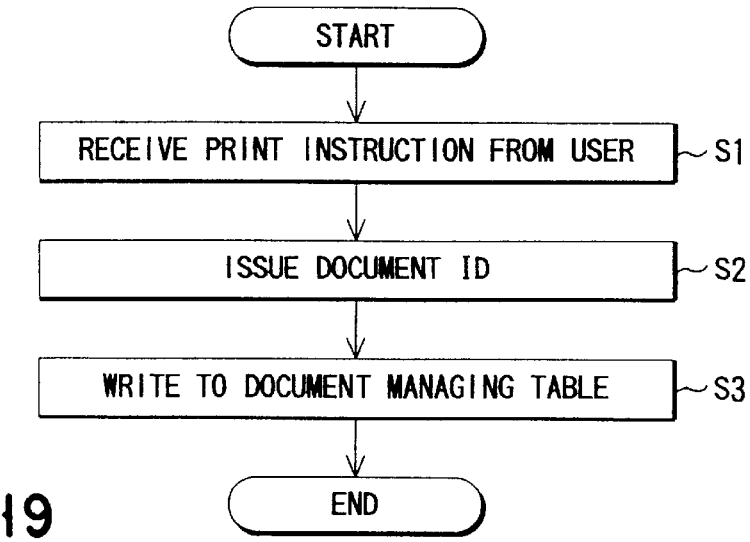

FIG. 19

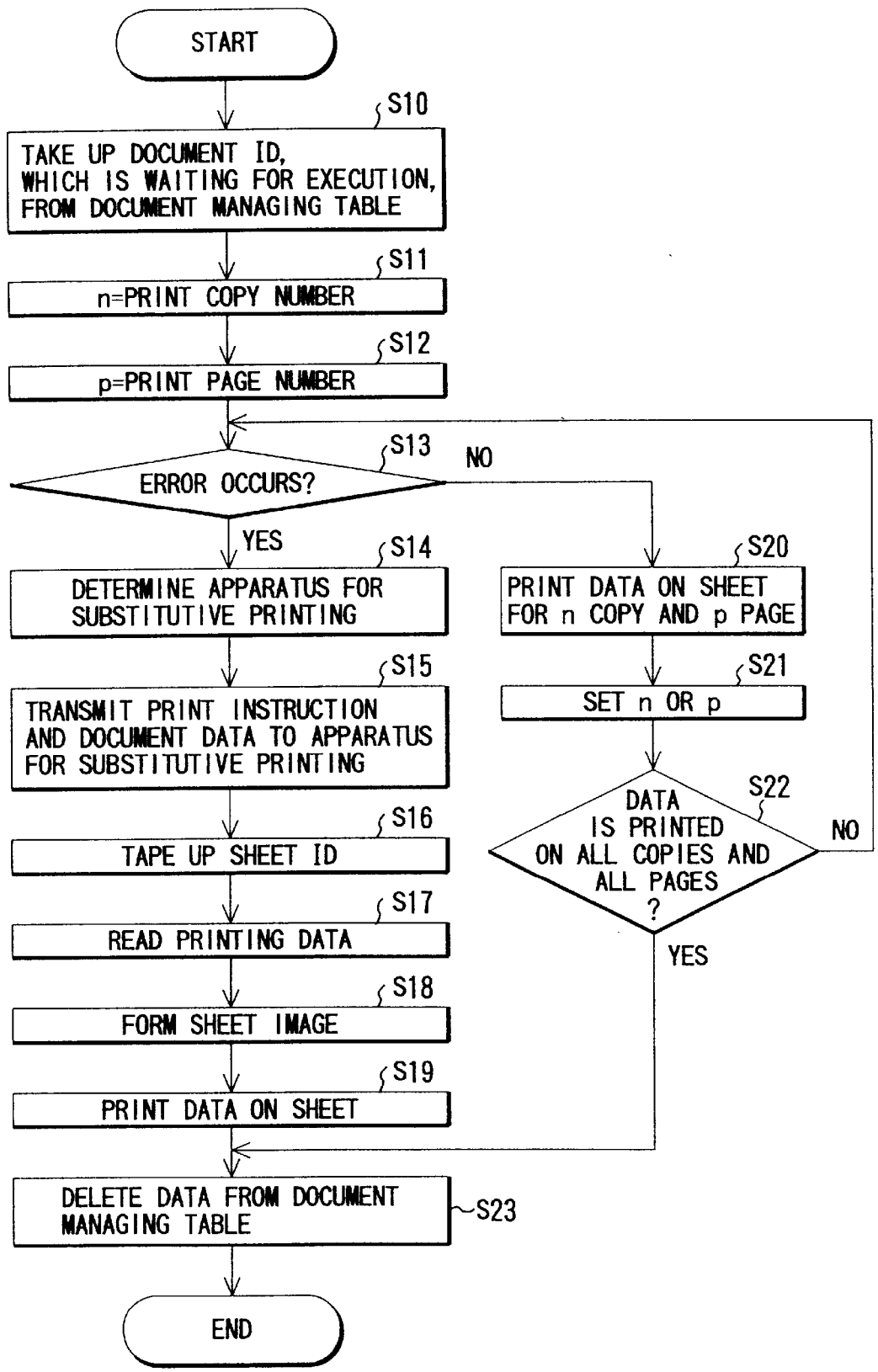
F I G. 20

PRINT PROCESSING METHOD FOR A PLURALITY OF PRINTING APPARATUSES CONNECTED TO A NETWORK

BACKGROUND OF THE INVENTION

1. Field of the Invention

The present invention relates to a print processing method for printing image data such as a document generated by a terminal connected to a network such as a LAN by an arbitrary printing apparatus connected to the same network.

2. Description of the Related Art

Recently, a network print system is frequency used. For example, a network environment such as an LAN, etc. is structured using a plurality of terminals and a plurality of printing apparatus. Then, an image generated by various kinds of terminals such as a facsimile apparatus, a computer, etc is output by a printing apparatus.

In such a network print system, image data of a document prepared by a terminal for printing is transmitted to a print apparatus designated on the network or a print server for storing and managing image data.

In the various kinds of print apparatus and the print server, received image data is temporarily stored in a print queue of an FIFO (First In First Out) type having a buffer memory, etc. Then, image data previously stored is printed.

For example, in a facsimile apparatus disclosed in Japanese Patent Application KOKAI No. 7-66927, if the printer of the facsimile is in an error state due to a paper jam, an ink depletion, a paper depletion, etc., the printing is executed by an outer printing apparatus for the printer of the facsimile. According to this technique, for transmitting print data to the outer printing apparatus, resolution and protocol can be converted to be suitable for the outer printing apparatus.

However, in the above prior art, there was no means for informing a user that substitutive processing was performed by the outer printing apparatus when the error occurs during the printing. Due to this, the user did not know by which printing apparatus the printing was executed. Also, it was impossible for the user to designate the substitutive printing apparatus. As a result, efficiency of the printing process was low.

SUMMARY OF THE INVENTION

An object of the present invention is to provide a print processing system, which can improve convenience to a user and efficiency of print processing when an error occurs during a printing process and the printing is executed by a substitutive printing apparatus.

According to the present invention, there is provided a print processing method for print-processing on a basis of print image data and print instruction data related to the print image data transferred from a terminal in a system comprising a plurality of printing apparatus connected to each other to be communicable with the terminal through a communication network, the method comprising: a receiving step of receiving the print instruction data and the print image data; a print-processing step of executing print-processing of the print image data in accordance with the print instruction data received by the receiving step; a detecting step of detecting an error at the time of executing the print-processing in the print-processing step; a determining step of determining a substitutive printing by use of the other printing apparatus in the system when the error is detected by the error detection step; a notifying step of notifying the substitutive print-processing to the other printing apparatus determined by the determining step; and an issuing step of issuing a report sheet on which data of the substitutive print-processing notified by the notifying step is printed.

According to the present invention, terminals, printing apparatus, and digital copying machines are connected to one network N. Each of the printing apparatus comprises mainly a communication portion, a document managing portion, a printing portion, an error detecting portion, an error processing portion, a report sheet issuing portion, a reading portion, a report sheet recognizing portion, and a controlling portion. The document controlling portion comprises a a document data storing portion and a document managing table. The error detecting portion comprises an error detecting table. The error processing portion comprises an error processing determining table, a print managing table, and a message managing table. The report sheet issuing portion comprises a report sheet managing table and a report sheet printing table.

If a print instruction command and document data (image data) is received from any one of the respective terminals, printing apparatus, digital copying machines, the printing apparatus (or digital copying machine) analyzes the content of the print instruction command. The document managing portion stores the received document data to the document data storing portion based on the result of the analysis. Then, the document managing portion generates managing data of document data so as to be stored to the document managing table.

If the error detecting portion detects an error during the printing of the document by the printing portion, the error detecting portion reads an error code corresponding to the error, and notifies the error code to the error processing portion. The error processing portion judges the error processing corresponding to the error code with reference to the error processing determining table. For example, if the content of the error processing is "substitutive printing", the error processing portion determines an apparatus for a substitutive printing. Then, the print instruction command, and document data of the document after, which is already printed at an error occurrence time, are transmitted to an apparatus address of the determined apparatus. Moreover, if it is needed that a report sheet be issued, the error processing portion designates a report sheet ID and a document ID, and requests the report sheet issuing portion to issue the report sheet. Therefore, even if the error occurs, data is transferred to the other printable apparatus and the printing can be continued. As a result, it is unnecessary to wait for an error release by the user. The report sheet issuing portion generates a corresponding report sheet image, and the printing portion prints the report sheet image. The report sheet includes the substitutive printing, a substitutive printing apparatus ID, a user ID, etc. If the substitutive printing occurs, the report sheet is issued from the original printing apparatus at the time when the error of the original printing apparatus is released. As a result, the user can understand that the printing has been executed by the substitutive printing apparatus and from which apparatus the printing result can be obtained. Moreover, the sheet can be issued with respective to each of the documents having various types of errors. As a result, if the different errors occur, it is possible for the user to know the occurrence of any specific error in any specific document in way to have the sheet and document corresponded to each other in a one-to-one relation. Thereby, convenience to the user and efficiency of print processing can be improved.

Document data to be printed is managed by the document managing table. It is assumed that an error, which is detected during the printing of document data, is a depletion of paper having a designated size. If a substitutive paper size is designated by the document managing table, the printing can be continued by use of paper having the substitutive paper size. Therefore, efficiency of the printing process can be improved.

It is assumed that the error detecting portion detects an error in which the printing itself cannot be executed such as "paper jam." The report sheet is issued after the error is released. As a result, if the error is released, the user can know that the substitutive printing has been executed, so that convenience to the user can be improved.

It is assumed that the error detecting portion detects an error such as a depletion of needles of a stapler during the printing of document data. The printing is stopped, and the report sheet issuing portion prepares a report sheet image including at least a document ID of document data whose printing process is stopped and an apparatus ID of the corresponding printing apparatus. Then, the printing portion prints the report sheet image. The user receives the printed report sheet, and makes a printing apparatus (DPPC) having an original document reading function read the report sheet. The report sheet recognizing portion of the user's desired printing apparatus specifies the apparatus ID of the apparatus, which has stopped the printing, and the document ID from data printed at a predetermined position on the report sheet. The error processing portion reads a corresponding apparatus address with reference to the print apparatus managing table. Then, the error processing portion requests the apparatus to transmit document data corresponding to the document ID. After receiving document data from the apparatus, the printing portion prints document data. In this way, the user can continue the printing of the residual documents only by inputting the report sheet to the substitutive printing apparatus, which the user wishes. As a result, security of the documents such as confidential documents can be highly maintained without being printed by the substitutive printing apparatus, which is located at a remote place.

Moreover, if the error is predicted at the time when the printing of document data is started, the error detecting portion notifies the document ID and the caution code to the error processing portion. The error processing portion reads the processing content corresponding to the caution code with reference to the error processing determining table. If the processing content is, for example, "notification to user", the error processing portion reads a message character string to be notified to the user from the message managing table. The read message character string is transmitted to a user address, which is obtained through the document managing portion. Thereby, the user can prevent the occurrence of errors, and efficiency of the print processing can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 8 is a view showing the specific example of a report sheet issued when a paper depletion error is detected in printing document data;

FIG. 9 is a view showing the specific example of a report sheet issued when a paper jam error is detected in printing document data;

FIG. 10 is a view showing the specific example of a report sheet issued when a stapler is empty of needles at the time of printing document data;

FIG. 11 is a view explaining the content of an caution message, which is prepared when occurrence of an error is predicted by an error detector, and which is transmitted to a user's terminal;

FIG. 12 is a view showing an example of a storage of a document managing table;

FIG. 13 is a view showing an example of a storage of an error detecting table;

FIG. 14 is a view showing an example of a storage of an error processing table;

FIG. 15 is a view showing an example of storage of a print apparatus managing table;

FIG. 16 is a view showing an example of a storage of a message managing table;

FIG. 17 is a view showing an example of a storage of a report sheet managing table;

FIG. 18 is a view showing an example of a storage of a report sheet printing table;

FIG. 19 is a flow chart showing a processing operation in which a print apparatus receives a user's designation for printing from a terminal through a network so as to prepare the document managing table;

FIG. 20 is a flow chart explaining a processing operation when the error is detected during the printing of document data, and showing a case of requesting the other printing apparatus to execute a substitutive printing;

DETAILED DESCRIPTION OF THE PREFERRED EMBODIMENTS

Embodiments of the present invention will be explained with reference to the drawings.

Figure 1:
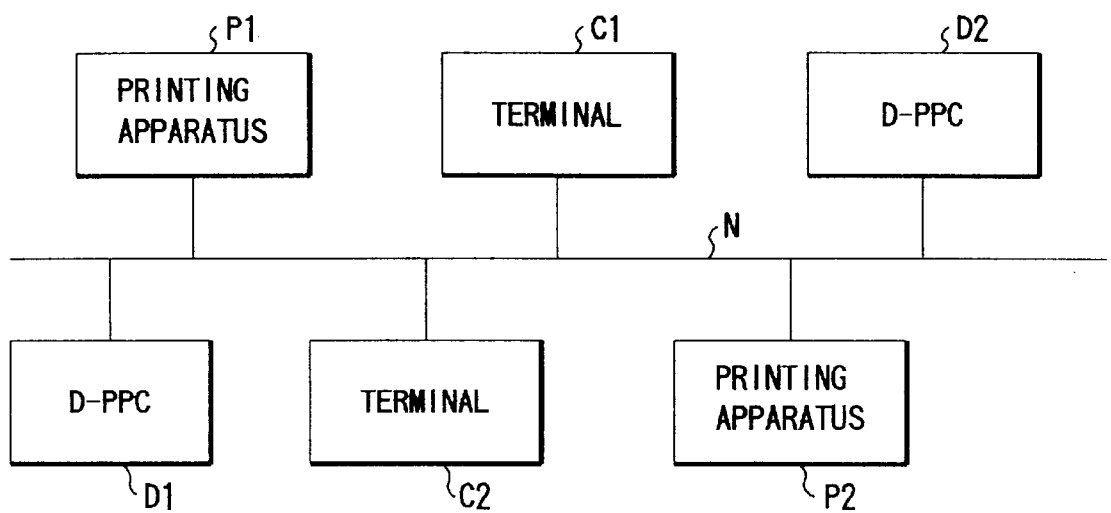
FIG. 1 is a view showing the entire structure of a network print system of one embodiment of the present invention.

FIG. 1 shows the entire structure of the network print system of the present invention. A plurality of terminals C1 an C2, a plurality of printing apparatus P1 and P2, and a digital copying machine (DPPC) are connected one another through a communication network. The network print system is used by a plurality of users, and the respective users are discriminated by individual discrimination data (ID, name, etc.).

Each of the terminals C1 and C2 prepares a document, etc., by use of various kinds of application software. An auxiliary memory may be connected to each of the terminals C1 an C2. In the auxiliary memory, image data such as a document (thereinafter referred to document data), which is prepared to be printed by either the printing apparatus P1 or P2 is stored.

Each of the printing apparatus, which are connected to the network N, prints document data under a CPU in accordance with a print execution processing program. In this case, the document data is generated by the terminals C1 and C2 or the other printing apparatus. Also, the print execution processing program is stored in the memory of each of the printing apparatus. Moreover, the CPU is provided in each of the printing apparatus.

Figure 2:
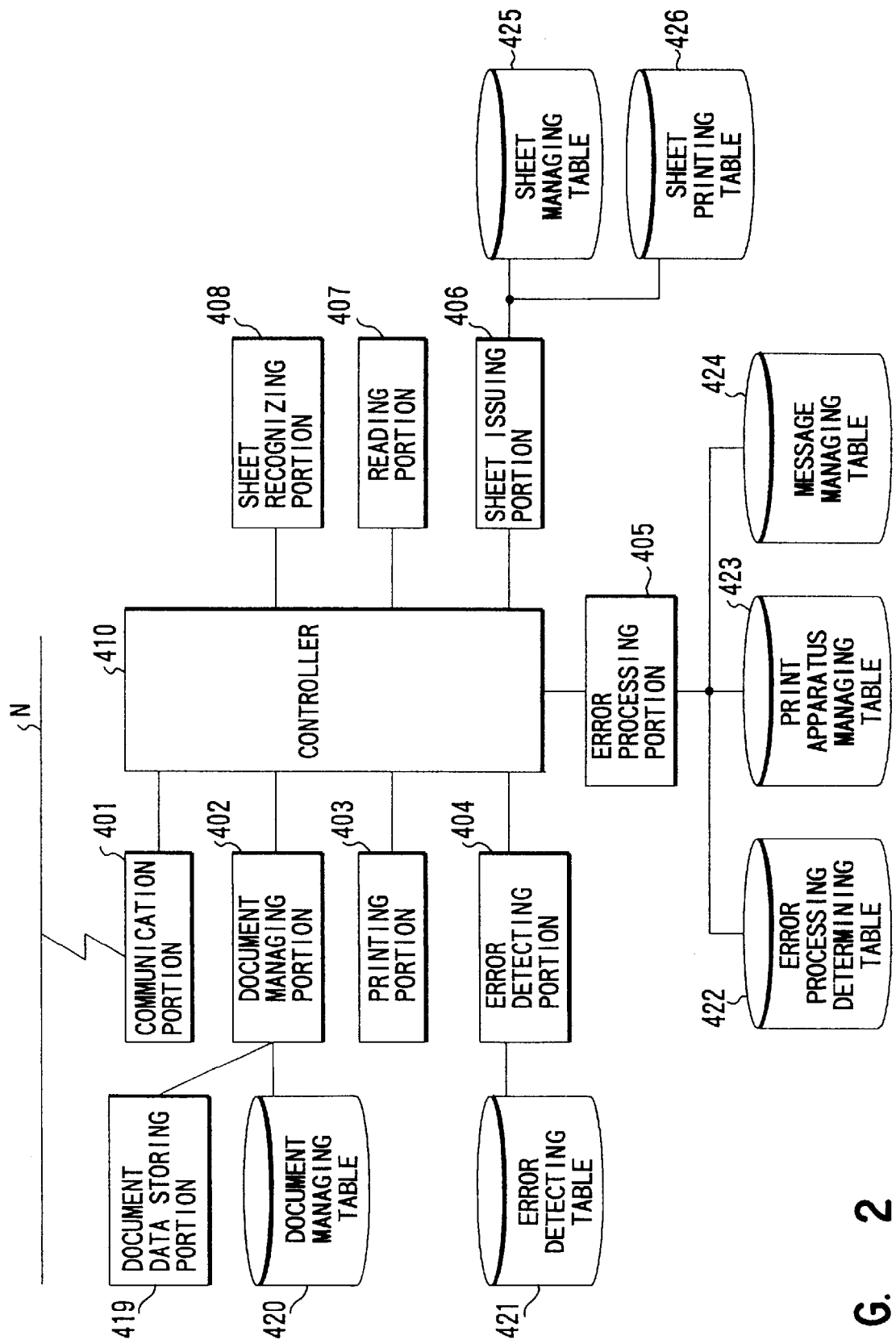
FIG. 2 is a block diagram schematically showing the structure of a print apparatus.

FIG. 2 is a block diagram schematically showing the structure of each of the print apparatus P1, P2 or D-PPC D1, D2 of FIG. 1. Each of the print apparatus P1 and P2 comprises mainly a communication portion 401, a document managing portion 402, a printing portion 403, an error detecting portion 404, an error processing portion 405, a report sheet issuing portion 406, a reading portion 407, a report sheet recognizing portion 408, and a control portion 410.

The communication portion 401 establishes communication between the terminals C1, C2 and the other print apparatus to receive and transmit a print designation command, document data, an error notification. The document managing portion 402 comprises a document data storing portion 419 and a document managing table 420. The document managing portion 402 receives the print designation command and document data through the communication portion 401. Then, the portion 402 stores document data in the document data storing portion 419 under control of a control portion 410 so as to manage document data recorded in the document managing table 420.

The printing portion 403 prints document data managed by the portion 402 and a report sheet image prepared by the report sheet issuing portion 406. The error detecting portion 404 comprises an error detecting table 421. The error detecting portion 404 detects whether or not the respective functions necessary for printing is normally operated with reference to the error detecting table 421. If an error is detected or the occurrence of the error is predicted, the portion 404 sends such information to the error processing portion 405.

The error processing portion 405 comprises an error processing determining table 422, a print apparatus managing table 423, and a message managing table 424. If the occurrence of the error or the prediction is notified from the error detecting portion 404, the error processing portion 405 executes a fixed processing, which is based on kinds of errors, with reference to these tables 422, 423, and 424. Regarding the fixed processing, for example, there are a request for a substitutive printing by the other print apparatus, the stop of printing, the designation to the report sheet issuing portion 406 to issue the report sheet, or transmission of the caution message to the user.

The report sheet issuing portion 406 comprises a report sheet managing table 425, and a report sheet printing table 426. If the issue of report sheet is designated from the error processing portion 405, the portion 406 generates a report sheet image with reference to the report sheet managing table 425 and the report sheet printing table 426, and transmits the report sheet image to the printing portion 403.

The reading portion 407 optically scans the report sheet image, which is input by the user, so as to be read. The report sheet recognizing portion 408 executes a predetermined image processing and a character recognition with respective to the report sheet image read by the reading portion 407. The control portion 410 controls each of the above-explained portions so that data communication between the respective portions is controlled.

Figure 3:
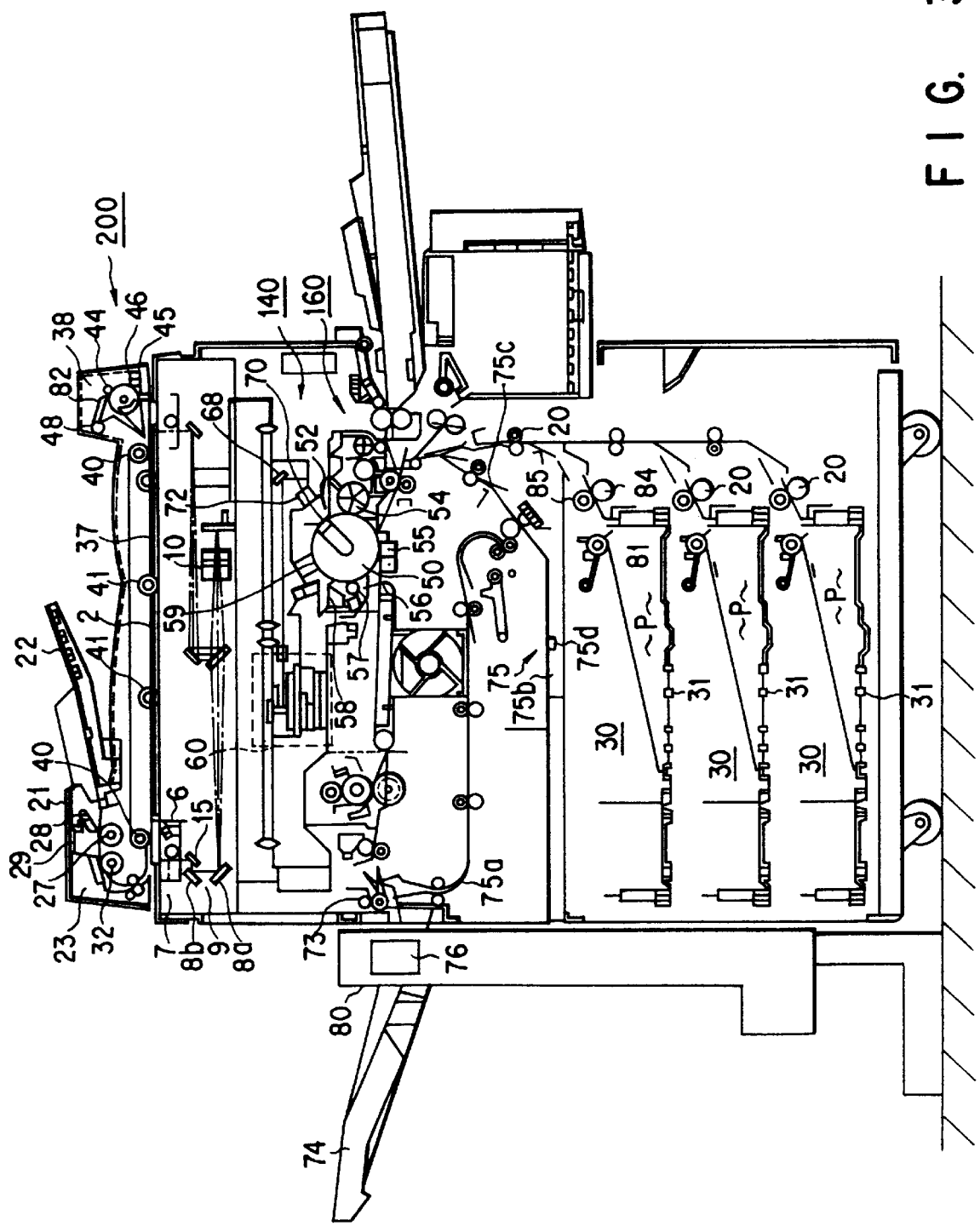
FIG. 3 is a cross sectional view of a digital copying machine of one embodiment of the present invention.

FIG. 3 schematically shows the overall structure of a digital copying machine (D-PPC) D1 or D2, which is used as an image input/output terminal, and which is connected to the network print system. The digital copying machine comprises an original-document reading portion 140 and an image forming portion 160. An automatic original-document supply unit 200 is mounted on an upper portion of the digital copying machine. When the report sheet is read by D-PPC, a job, which is designated by the D-PPC, is executed. Also, the output of the report sheet is designated by the terminal, the report sheet is output from the printer portion of the D-PPC. In other words, D-PPC can operate as both an image input means and an image output means.

The automatic original-document supply unit 200 has a cover body 21 serving as a frame. The cover body 21 has a rear end which is fastened to the rear end of the upper portion of the body of the copying machine by a hinge unit (not shown). As a result, the cover body 21 can be opened and closed as required. Thus, the overall body of the supply unit 200 can be rotated and displaced to open the upper portion of an original-document retainer 2. An original-document supply frame 22 is disposed at a somewhat leftward position of the upper surface of the cover body 21. The original-document supply frame 22 is capable of collectively holding a plurality of original-document sheets. An supply means 23 is disposed at an end of the copying machine. The supply means 23 extracts the original-document sheets one by one so as to be supplied to an end (the left end of this figure) of the original-document retainer 2.

The original-document reading portion 140 comprises an exposure lamp 6 serving as a light source, a first carriage 7 having a mirror 15, a second carriage 9 having mirrors 8a and 8b for warping an optical path, a lens 10, a photoelectric conversion portion 11 for receiving reflected light, a drive system (not shown) for changing the positions of the foregoing elements, and an A/D conversion portion (not shown) for converting an output from the photoelectric conversion portion 11, that is, image data from analog data to digital data. The first and second carriages 7 and 9 are connected to each other by a timing belt (not shown). The second carriage 9 is structured to be moved in the same direction as that of the movement of the first carriage 7 at a speed which is the half of that of the first carriage 7. As a result, scanning can be performed such that the length of the optical path to the lens 10 is made to be constant. The lens 10 is structured to have a fixed focal length, and to be moved in the direction of the optical axis when the magnification is changed. The photoelectric conversion portion 11 photoelectrically converts light reflected by the original document. The photoelectric conversion portion 11 mainly comprises, for example, a CCD line image sensor. In this case, one pixel of the original document corresponds to one element of the CCD censor. An output from the photoelectric conversion portion 11 is transmitted to the A/D conversion portion. The movement of each of the first and second carriages 7 and 9 and the mirrors 12a and 12b is performed by a stepping motor (not shown). The first and second carriages 7 and 9 are moved in accordance with the operation of a timing belt (not shown), which is arranged between a drive pulley (not shown) connected to a rotational shaft of the stepping motor and an idle pulley (not shown). The lens 10 is structured to be moved in the direction of the optical axis due to spiral operation of a spiral shaft (not shown) rotated by a corresponding stepping motor (not shown).

The image forming portion 160 is formed by combining, for example, a laser optical system 60 having a laser generator and a polygon mirror, and an electrophotographic portion, which is capable of forming an image on transfer paper. That is, the image forming portion 100 has a photosensitive drum 50 serving as an image center rotatively journalled at substantially the central portion of the copying machine. Then, an exposure unit 52, a development unit 54, a transference charger 55, a separation charger 56, a cleaning charger 57, a destaticizing charger 58, and a charger 59 are disposed in this sequential order around the photosensitive drum 50. The photosensitive drum 50 is uniformly charged by the charger 59. Also, a laser beam emitted from the laser optical system 60 causes the image of the original document to be formed on the photosensitive drum 50 so that an electrostatic latent image is formed.

The electrostatic latent image formed on the photosensitive drum 50 is developed by the development unit 54. The developed image is transferred to copying paper P by the transference charger 55. In this case, the copying paper P is supplied from a sheet supply cassette 30 serving as a paper supply means to be described later through a resist controllers 20. The copying paper having the image transferred by the transference charger 55 is separated by the separation charger 56 due to AC corona discharge, and then conveyed to a fixing unit 72 by the conveyance belt. The image developed by the fixing unit 72 is melted and fixed.

Figure 4:
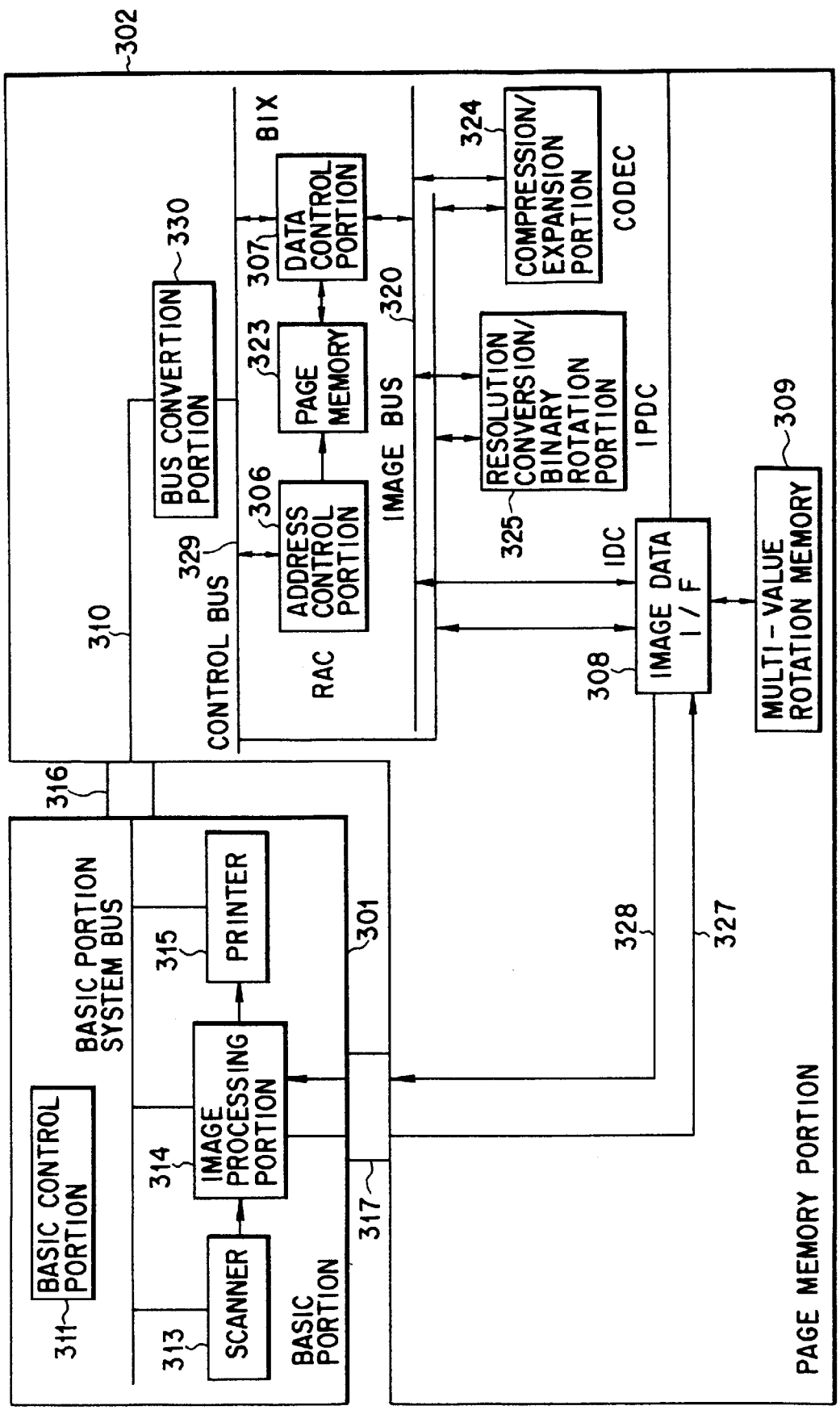
FIG. 4 is a system structural view of the digital copying machine.
Figure 5:
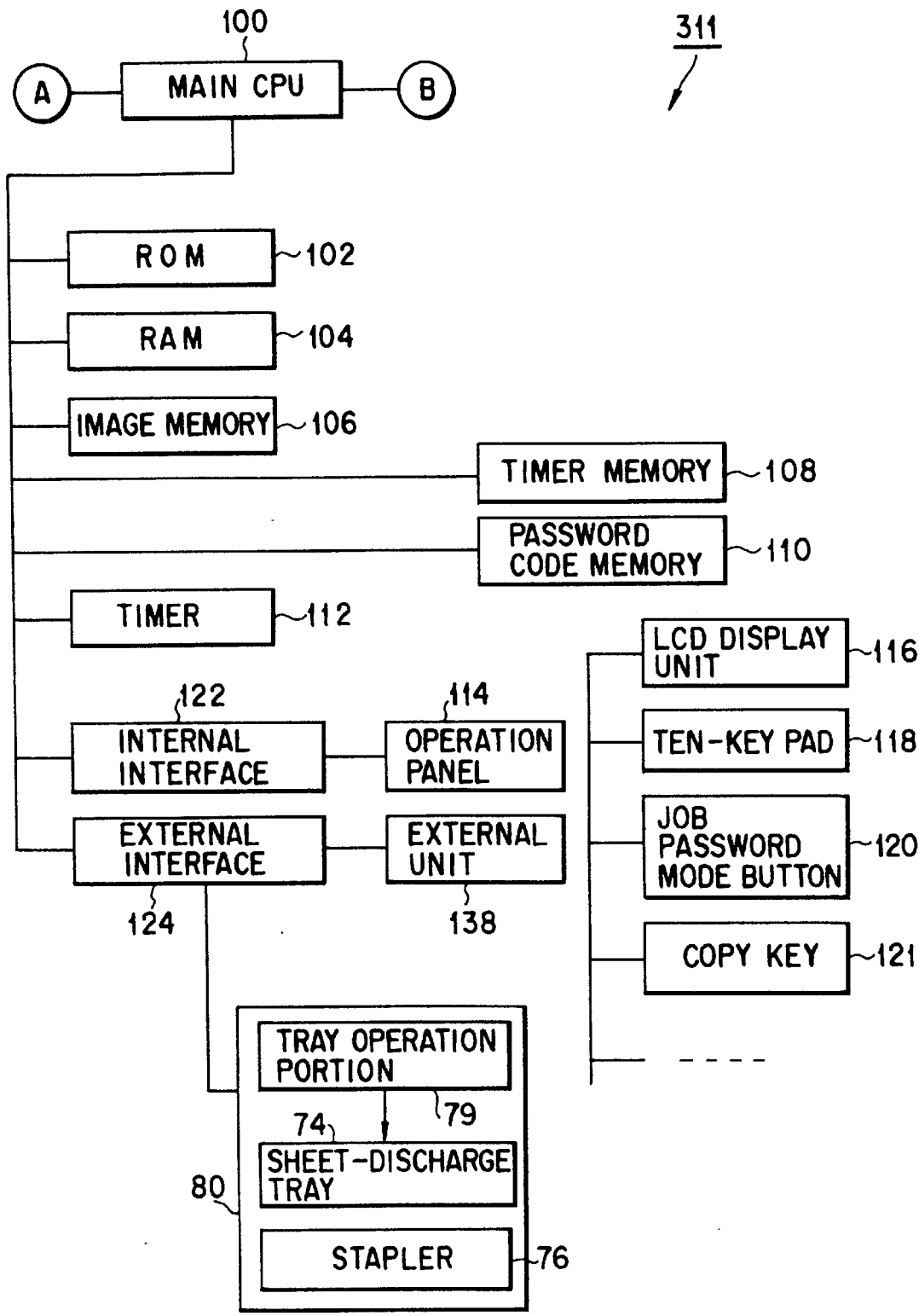
FIG. 5 is a block diagram showing the structure of a basic CPU.
Figure 6:
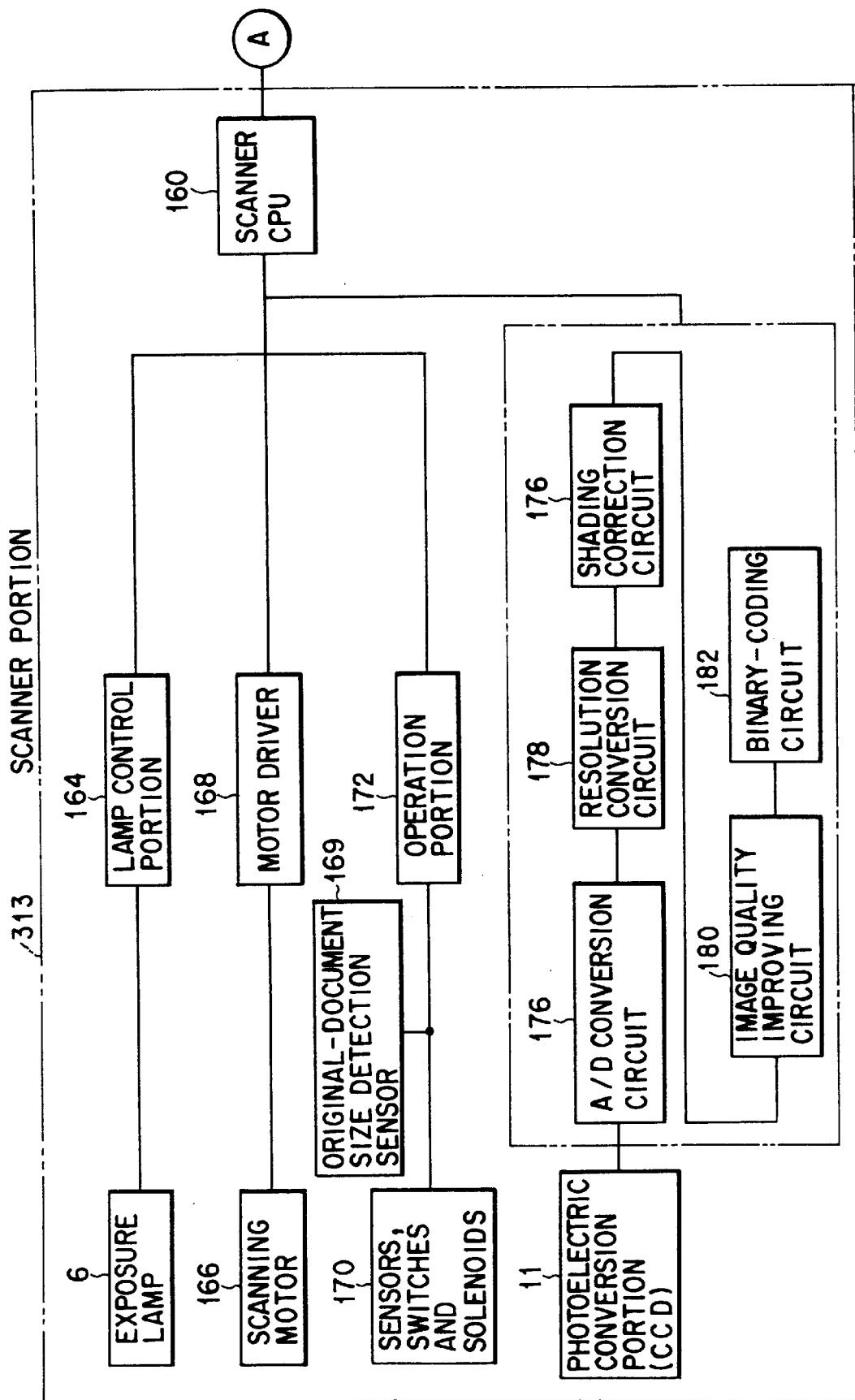
FIG. 6 is a block diagram showing the structure of a scanner portion.

Referring to FIGS. 4 to 7, control circuits for a digital copying machine will be described. FIG. 4 is a schematic block diagram showing the structure of the image forming apparatus such as a digital copying machine control system according to the embodiment of the present invention. FIG. 5 shows a CPU, and FIG. 6 shows a printer portion.

As shown in FIG. 4, the digital copying machine control system is formed of two blocks consisting of a basic portion 301 and a page memory portion 302. In the basic portion 301, an image processing portion 314 is connected between a scanner 313 and a printer 315 so that the digital copying machine is formed. The page memory portion 302 realizes memory copy by receiving and storing image data from the basic portion 301 and by again transferring the stored image data items to the basic portion 301. The basic portion 301 and the page memory portion 302 are connected to each other by a basic portion system interface 316 for communicating control data and a basic portion image interface 317 for communicating image data.

The basic portion 301 comprises the scanner 313, the printer 315, the image processing means 314, and a basic control portion 311 for controlling the scanner 313, the printer 315, and the image processing means 314.

As shown in FIG. 5, a ROM 102, a RAM 104, an image memory 106, a timer memory 108, a password code memory 110, a timer 112, an interface 122, and an external interface 124 are connected to a main CPU 100 of the basic control portion 311. An operation panel 114 is connected to the internal interface 122. The operation panel 114 has an LCD display unit 116, a ten-key pad 118, a job password mode button 120, a copy key 121, and the like.

Referring to FIG. 6, the detailed structure of the scanner 313 will be described. First, "report sheet" is recognized by the scanner 313 so as to be read. The scanner CPU 160 of the scanner 313 is connected to a lamp control portion 164 for controlling an irradiation lamp 6, a motor driver 168 for controlling a scanning motor 166, an original-document size detecting sensor 169 and an operation portion 172 for operating and controlling variable sensors, switches and solenoids 170 so as to control the connected elements. The scanner CPU 160 is also connected to an A/D conversion circuit 176 for processing image information supplied from the photoelectric conversion element 11, a resolution conversion circuit 178, a shading correction circuit 176, an image quality improving circuit 180 and a binary-coding circuit 182 so as to control the connected elements.

Figure 7:
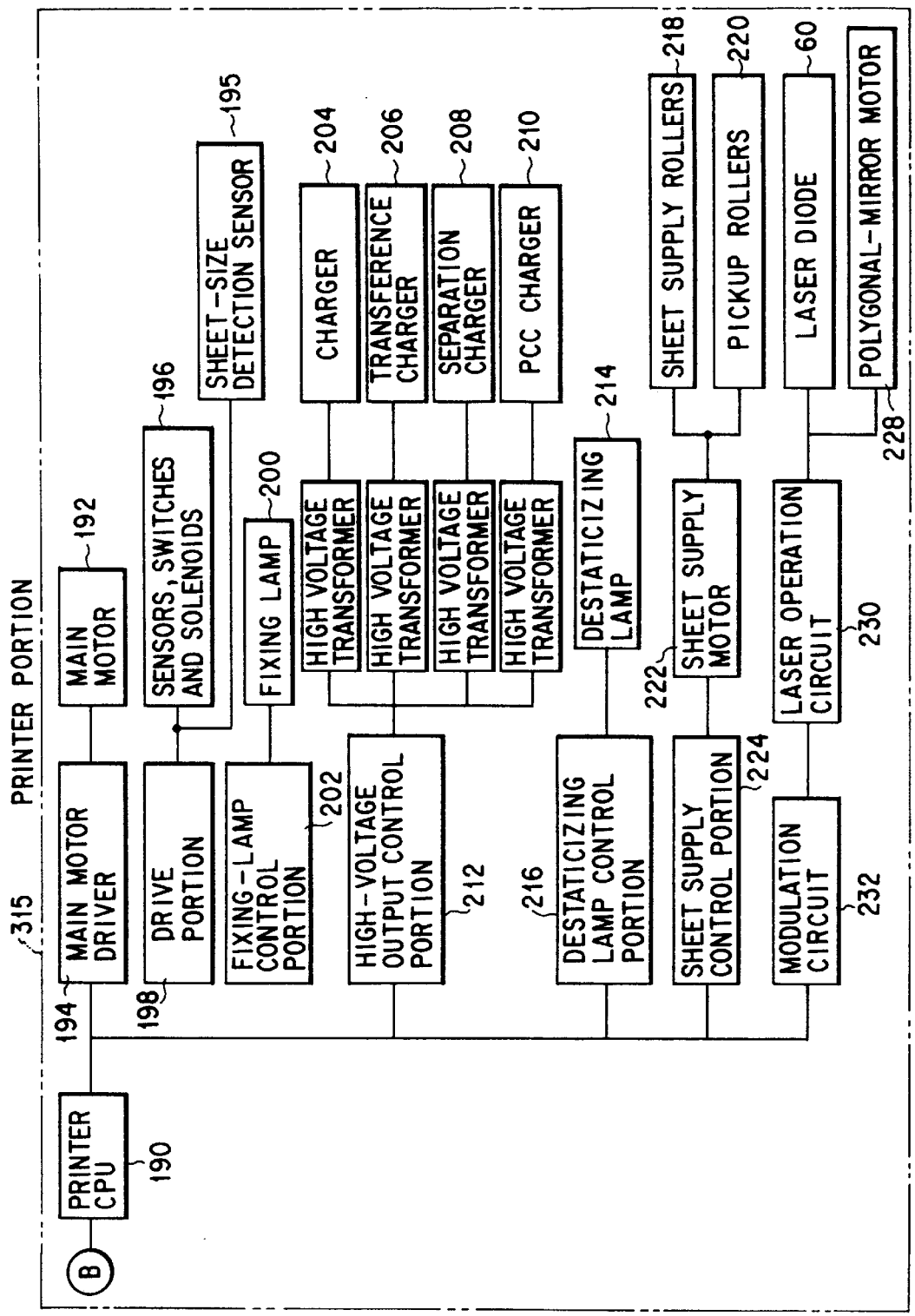
FIG. 7 is a block diagram showing the structure of a printer portion.

Referring to FIG. 7, the printer 315 will be described in detail. In the printer 315, a printer CPU 190 is connected to a main motor driver 194 for rotating a main motor 192, a sheet-size detection sensor 195, an operation portion 198 for controlling sensors, switches and solenoids 196, a fixing-lamp control portion 202 for controlling a fixing lamp 200, a high-voltage output control portion 212 for controlling a charger 204, a transference charger 206, a separation charger 208 and a PCC charger 210, a destaticizing lamp control portion 216 for controlling a destaticizing lamp 214, a sheet supply control portion 224 for controlling a sheet supply motor 222 for rotating sheet supply rollers 218 and pickup rollers 220 and a modulation circuit 232 for controlling a laser operation circuit 230 for the electrooptic conversion portion (laser diode) 60 and a polygonal-mirror motor 228.

The page memory portion 302 will now be described in detail with reference to FIG. 4. The structure of a bus line 310 connected to a system bus 318 of the basic portion 301 is converted into a bus line 329 by a bus conversion portion 330. A page memory 323 temporarily stores image data, while an address control portion 306 generates address for the page memory 323. An image bus 320 is a bus line for transferring data between apparatus in the page memory portion 302. A data control portion 307 controls data transference when data is transferred between the page memory 323 and the other apparatus through the image bus 320.

An image data I/F 308 interfaces image data when image data is transferred to and from the basic portion 301 through the basic-portion image interface 317. The image data I/F308 is connected to the network N. The image data I/F308 transmits data input through the scanner portion of D-PPC to the other equipment through the network N. Or, the image data I/F308 received data transmitted from the other equipment through the network N. Then, the image data I/F308 sends such data to the printer portion. A resolution conversion/binary rotation portion 325 converts the resolution of image data to the resolution of another unit when image data is transmitted to the unit having the different resolution. Also, the resolution conversion/binary rotation portion 325 converts image data received from a unit having a different resolution to the resolution of the printer 315 of the basic portion 301, and rotates binary-coded image data by an angular degree of 90 degrees.

A compression/expansion portion 324 compresses supplied image data for the apparatus for performing facsimile transmission or optical disc storage which compresses and transmits image data. Also, the compression/expansion portion 324 expands image data in the compressed form to be visualized through the printer 315. A multi-value rotation memory 309 is connected to the image data I/F 308, and operated to rotate image data by angular degree of 90 degrees or −90 degrees so as to transmit the rotated image data when the image data is transmitted to the printer 315.

FIG. 8 shows a specific example of report sheet issued when an error is detected at the time of printing document data by the print portion 403 in the above-structured printing apparatus shown in FIG. 2. Specifically, this is the report sheet, which is issued when the error detection portion 404 detects an error of "paper depletion" and the user requests the other printable printing apparatus for the substitutive printing. On the report sheet, there are printed a character string showing the content of the error, "paper has been depleted", a character string showing the main content of the error processing, "the residual documents have been printed by the next apparatus", and a character string showing the specific content of the error processing, "receiving date and time, destination to be transferred, setting location, name of user (who asked to print)." Thereby, it is possible for the user to easily understand what error occurred during the print processing. Also, the user can easily understand when and who the print processing was designated, and what error processing was performed.

FIG. 9 shows a specific example of report sheet issued when the other error is detected at the time of printing document data by the print portion 403 in the above-structured printing apparatus shown in FIG. 2. Specifically, this is the report sheet, which is issued when the error detection portion 404 detects an error of "paper jam" and the user requests the other printable printing apparatus for the substitutive printing, and the error is corrected. On the report sheet, there are printed a character string showing the content of the error, "paper has been jammed", a character string showing the main content of the error processing, "the residual documents have been printed by the next apparatus", and a character string showing the specific content of the error processing, "receiving date and time, destination to be transferred, setting location, name of user." Thereby, it is possible for the user to easily understand what error occurred during the print processing. Also, the user can easily understand when and who the print processing was designated, and what error processing was performed.

FIG. 10 shows a specific example of report sheet issued when the other error is further detected at the time of printing document data by the print portion 403 in the above-structured printing apparatus shown in FIG. 2. Specifically, this is the report sheet, which is issued such that the user can select a desired printing apparatus and continue to print when the error detection portion 404 detects an error of "the staple is empty of needles". On the report sheet, there are printed a character string showing the content of the error, "stapler has emptied", a character string showing the present printing state of the document, "the print of this document is stopped now", and a character string prompting the user what processing to be performed, "if the needles for stapler are supplied, the printing is restarted by this apparatus. Also, if the report sheet is inserted to the scanner of any of the following apparatus, residual data is printed", and a character string showing data of document having the error occurred, "receiving date and time, name of user." Moreover, an identifier, which specifies the apparatus having an error and the document having an error, is printed on the upper right portion of the report sheet in a bar code form. The bar code includes an apparatus ID of the print apparatus having an error and a document ID having an error. A user's desired print apparatus reads the bar code, inputs residual document data from the print apparatus having the error so as to be printed. Thereby, the user can easily understand what error occurred during the print processing. And, it is possible for the user to easily understand what the present state is. Also, the user can easily understand when and who the print processing was designated. Moreover, the user can easily understand what the user should do and how the printing is restarted.

FIG. 11 shows a specific example of report sheet on which an caution message is printed. The caution message is prepared when occurrence of an error is predicted by the error detection portion 404 in accordance with the user's designation for printing. The message is transmitted to the user's terminal, or printed on the report sheet. The message includes a character string showing the start of printing, "the print of the document you asked is started", a character string cautioning the content of the occurrence of the error will be predicted, "However, paper is lacking during the printing", a character string prompting the user what processing to be performed, "supply paper as soon as possible", and a character string showing which document was predicted to generate an error "receiving date and time, name of user." By transmitting or displaying these data items, it is easily understand what error can be predicted to be generated. Also, the user can easily understand which document the error occurs and what processing should be performed not to generate such an error.

FIG. 12 shows an example of the memory of the document managing table 420. The document managing table 420 comprises a plurality of items including a document ID, a pointer to document data, receiving date and time, a user address, the number of copies, the number of pages, a print copy number, a print page number, an execution state, a release code, a transfer device ID, a paper size, and a substitutive paper size.

In the document ID, there are stored the document IDs, which are designated to be printed by the plurality of the terminals connected to the network N or the printer. Each document is specified by the document ID. In the item for the pointer to document data, there are stored pointers (e.g., sector number of a hard disk) designating the memory area of the document data storing portion 419 where the respective document data items are actually stored. At a document data reading time, the pointer is first read so as to read desired document data from the document data storing portion 419. In the date and time item, there is stored date and time when the print designation of each document was received. In the user address item, there are stored user addresses for notifying the message to the user, who designated the printing. In the item for the number of copies, there are stored the number of copies designated by the user. In the page number item, the page number of each of the documents is stored. In the item for the print copy number, an initial value of the copy number to be printed. In the item for the print page number, an initial value of the print page to be printed. In the execution state item, there are stored execution states, for example, the document is being printed, the document is waiting for the execution of printing, or waiting for the error release. In the release code item, there are stored the release codes for specifying as to which release each document is waiting for if each document is waiting for the error release. In the transfer device ID item, there are stored device IDs for specifying which printer performed the substitutive printing when each document was printed by the other printer. In the paper size item, there are stored sizes of paper for printing data. In the substitutive paper size item, there are stored substitutive sizes of paper if there is no specific size of paper.

Among the managing items of the document managing table shown in FIG. 12, for example, the user address, the number of copies, the number of pages, the print copy number, the print page number, the paper size, and the substitutive paper size are data, which is recognized when each print apparatus analyzes the content of the print designation command received through the communication portion 401.

By the above-explained document managing table 420, each document is specified by the document ID. Regarding each document, it is possible to retrieve the following items from the document ID.

Specifically, what document data is, when the printing was designated; who designated the printing; how many copies of the documents should be printed; what page should be printed; what release the document is waiting for when the error occurs; and by which printing apparatus the document was printed in requesting for the substitutive printing.

FIG. 13 shows an example of the memory of the error detecting table 421. The error detecting table 420 comprises a plurality of items including checking items, a performing state, an caution value, an error value, an caution code, an error code, and a release code.

The checking items to be detected during the printing include "the number of papers", "paper jam", "the number of needles for stapler", and "a toner capacity." In the performing state item, there are stored numerical values showing the performing state of each error checking item. For example, there are stored "100" showing the number of residual paper, "50" showing the number of the needles for the stapler, "20" showing the toner capacity, and "1" showing no paper jam or "0" showing the occurrence of paper jam.

In the caution value item, there are stored threshold values for predicating the occurrence of the error based on the values stored in the performing state item. The error detecting portion 404 predicts occurrence of an error when the value of the performing state item is the value of the caution value item or less. For example, the toner capacity is "10" or less, the error detection portion 404 predicts the occurrence of the toner depletion error. In the caution value time, not only a constant but also a variable, which is varied every document, is set. For example, a head character is defined by a mark, a . In this case, if the number of papers is smaller than "the number of pages" of the document to be printed, the error detecting portion 404 predicts the occurrence of the paper depletion error. Regarding the error such as a paper jam, etc., which cannot be predicted are not predicted, the caution value and the caution code are not set.

In the error value item, there are stored threshold values, which are regarded as occurrence of error with respect to each value of the performing state item. The error detecting portion 404 regards that an error occurs when the value of the performing state item is the value of the error value item or less. For example, the error detecting portion 404 regards that an error occurs when the number of paper is "1" or less, the paper jam state is "0", the number of needles of the stapler is "O", and the toner capacity is "5" or less, respectively.

In the caution code item, there are stored caution codes for specifying which error was predicted when the error was predicted. In the error code item, there are stored error codes for specifying which error was generated when the error was generated. In the release code item, there are stored release codes for specifying which error was released when the error was released.

By use of the error detecting table 421, regarding each of the checking items, the current performing state can be detected. It is possible to predict the error of the document to be printed. Or, the occurrence of the error can be detected. Moreover, by detecting the change from (current performing state)≦(error value) to (current performing state)>(error value), it is possible to detect that the error has been released. In this way, the prediction of error, the occurrence of error, and the release of error can be specified, respectively.

FIG. 14 shows an example of the memory of the error processing determining table 422. The error processing determining table 422 comprises a code item, a processing content item, a report sheet issue item, a report sheet ID item, and a message ID item.

In the code item, there are stored codes for specifying the prediction of error, the occurrence of error, and the release of error, respectively. These codes correspond to the error codes, the caution codes, and the release codes of FIG. 13. In the processing content item, there are stored the processing contents, e.g., "substitutive printing", "stop printing", "document deletion", etc., which are executed when the respective codes are notified. In the report sheet issue item, there are stored instructions showing whether or not the report sheet is issued or not when each code is notified. In the report sheet ID item, there are stored report sheet IDs for specifying the report sheet to be issued based on each code. For example, in the case of the code in which no report sheet is issued, for example, report sheet ID "0" is stored. In the message ID item, there are stored message IDs for specifying the message to be transmitted based on each code. For example, in the case of the code in which no message is transmitted, for example, message ID "0" is stored.

By each of the notified codes shown in the error processing determining table 422, it is determined what processing is executed when a certain error code is notified to the error processing portion 405 from the error detecting portion 404. Also, it is determined which report sheet is issued in the case of issuing the report sheet. Moreover, it is determined which message is transmitted in the case of transmitting the message.

FIG. 15 shows an example of the memory of the print apparatus managing table 423. The print apparatus managing table 423 stores data showing the state of each of the other print apparatus connected through the network N. The print apparatus managing table 423 comprises a device ID item, an item for a name of an apparatus, an apparatus address item, a setting location item, and a performing state item.

In the apparatus ID item, there are stored IDs for specifying the other print apparatus connected through the communication portion 401 and the network N. Each of the apparatus IDs corresponds to each of the transfer device IDs. In the item for a name of an apparatus, there are stored names of the respective apparatus. In the apparatus address item, there are stored destination addresses to be transmitted which are used to send a request for printing to each apparatus.

In the setting location item, there are stored locations where the respective apparatus are set. In the performing state item, there are stored the current states of the respective apparatus such as "print executing", "waiting", and "error occurrence." The print apparatus managing table 423 manages the other apparatus to which the present printing apparatus is connected through the communication portion 401. It is possible to retrieve the name of the apparatus, the address for transmitting instruction of the substitutive printing, the setting location of each apparatus, and the performing state of each apparatus from the apparatus ID.

FIG. 16 shows an example of the memory of the message managing table 424. The message managing table 424 stores each message to be printed on the report sheet. The message managing table 424 comprises a message ID item, and a message data item.

In the message ID item, there are stored message IDs for specifying the respective messages. In the message data item, there are stored character strings showing the content of each messages. In this case, the fixing character string is divided by double quotation marks (") and ("), and ¥ n shows a paragraph. Also, regarding a variable, which is varied every document, a head character is defined by, for example, a mark, α.

Thereby, a message, which corresponds to each document, can be prepared by designating only the message ID and the document ID. For example, in message ID "1", if the receiving date and time of each document and the user address are substituted for the portions, "a receiving date and time" and "a user address", the message, which is suitable for each document, can be prepared.

FIG. 17 shows an example of the memory of the report sheet managing table 425. The report sheet managing table 425 comprises a report sheet ID item, an item for a pointer to report sheet printing table, and a document ID printing item.

In the ID report sheet item, there are report sheet IDs for specifying the respective report sheets. Each of these report sheet IDs corresponds to each of the report sheet IDs of the error processing determining table 422 shown in FIG. 14. In the item for a pointer to report sheet printing table, there are pointers for reading one of a plurality of report sheet printing tables to be describes later.

In the document ID printing item, there are stored instructions whether or not the document ID, which specifies the document, is printed at a predetermined position on the report sheet together with the apparatus ID allocated to each apparatus.

In the above-mentioned report sheet managing table 425, only by designating the report sheet ID, the report sheet printing table for forming each report sheet image can be read so as to form the report sheet image. Moreover, it is possible to determine whether or not the ID code for specifying the apparatus and the document is formed on the report sheet image.

FIG. 18 shows an example of the temporary memory of a plurality of report sheet printing tables 426 each corresponding to the report sheet ID. Each of the report sheet printing tables 426 comprises a part ID item, an item for a kind of parts, a part data item, and a printing position item.

In the part ID item, there are stored IDs for specifying the respective parts. In this case, each of "parts" indicates each character string (or image) whose printing position on the report sheet is designated. In the item for a kind of parts, there are stored kinds of parts such as a "character string", an "image", etc.

In the part data item, there are stored characters to be printed at each part and image data. In FIG. 18, the fixing character string is divided by double quotation marks (") and ("). Also, regarding a variable, which is varied every document, a head character is defined by, for example, a mark, α.

In the printing position item, there are stored the position where the printing of each part is started and the size, which are shown by coordinate values when the upper left portion of the report sheet is set as an origin.

Regarding each part to be printed on the report sheet, the kind of parts, printing data, and the printing position can be retrieved from the part ID by the report sheet printing table 426. For example, in the case of the part ID "1", the following points can be understood.

Specifically, part data "paper depletion occurs" using the "character string" is printed at the position of (100, 100) to have a width of 800 and a height of 100 in the case where the upper left portion of the report sheet is set as an origin. In the case of the part ID "4", the following points can be understood.

Specifically, date and time when the designated document was received using the "character string" is printed at the position of (100, 100) to have a width of 200 and a height of 100 in the case where the upper left portion of the report sheet is set as an origin.

The following will explain a print processing operation of the network print system to which the above-structured printing apparatus is connected.

FIG. 19 is a flow chart explaining the processing operation in which a printing apparatus, e.g., P1 receives a user's designation for printing from a certain terminal through the network from the terminal C1 or C2 so as to prepare the document managing table 420 as shown in FIG. 12.

If the communication portion 401 of the printing apparatus P1 receives a print designation command from the user, the control portion 410 analyzes the content of the received command, and receives document data so as to be stored in the document data storing portion 419 (step S1). The document managing portion 402 issues the document ID which can specify document data (step S2). The document managing portion 402 writes managing data of this document to the document managing table 420 based on the result of the analysis of the print designation command by the control portion 410 (step S3). In other words, the document managing portion 402 writes the following data to the document managing table 420.

Specifically, there are the issued document ID, the pointer to the received document data, receiving date and time, the address of the user who designated the printing, the number of copies designated by the user, an the number of pages.

Moreover, the document managing portion 402 writes an initial value "1" to the print copy number and the print page number, an initial value "waiting for execution" to the execution state, an initial value "0000" to the error code, an initial value "0" to the transfer ID, respectively. If the paper size is designated by the user, the document managing portion 402 writes the substitutive paper size.

FIG. 20 is a flow chart explaining the processing when the error is detected during the printing of document data and the substitutive printing is executed by the other printing apparatus.

First, the document managing portion 402 takes up the document ID whose execution state item is "waiting for execution" from the document managing table 420 (step S10). Then, the value of the print copy number item of the document managing table 420 is set to parameter n for printing (step S11). The value of the print page number item of the document managing table 420 is set to parameter p for printing (step S12). The printing for n copy and page is started.

If the printing is started, the error detection portion 404 checks whether or not an error occurs with reference to the error detecting table 421 (step S13). Specifically, the error detection portion 404 compares the performing state with the error value in each check item. If the performing state is the error value or less, the error detection portion 404 judges that the error occurs, and notifies the corresponding error code to the error processing portion 405. For example, if the performing state of the check item "number of paper" is the error value "1" or less, the error detection portion 404 notifies error code "E001" to the error processing portion 405 together with the document ID.

If the error detection portion 404 detects the occurrence of the depletion of paper having the size designated by the user, the following operation may be performed.

Specifically, the error detection portion 404 notifies the depletion of paper to the document managing portion 402 before notifying the error code to the error processing portion 405. Then, the error detection portion 404 checks whether or not the substitutive paper size is designated with reference to the document managing table 420. If the substitutive paper size is designated, the printing using the paper size is continued. If the substitutive paper size is not designated (e.g., "NULL" is stored in the substitutive paper size item of the document managing table of FIG. 12), the error code may be notified to the error processing portion 405.

The error processing portion 405 determines a substitutive printing apparatus based on the received error code from the error processing determining table 422 if the error processing content item is "substitutive printing" (step S14). At this time, the error processing portion 405 judges that the apparatus is printable from the print apparatus managing table 423 when the performing state item of each apparatus is "waiting" or "executing." Thereby, the apparatus is set as the substitutive printing apparatus.

Thereafter, a print instruction command and document data of the designated document ID (after n copy and p page) are transmitted to the apparatus address of the determined apparatus (step S15). Then, the error processing portion 405 takes up the report sheet ID from the report sheet ID item with reference to the table 422 when the report sheet issuing item, which corresponds to the received error code, is set to "existence" (step S16). Thereby, the report sheet ID and the document ID are designated so as to be sent to the report sheet issuing portion 406.

The report sheet issuing portion 406 receives the report sheet ID and the document ID from the error processing portion 405. Then, the report sheet issuing portion 406 reads out one report sheet printing table 426 corresponding to the report sheet ID with reference to the report sheet managing table 425 so as to read data corresponding to the respective part IDs (step S17). Then, a report sheet image is generated (step S18). For example, in the part ID "1", a character string image, that is, "paper has been depleted" is generated in the range from the position (100, 100) to the position (800, 100) when the upper left portion of the report sheet is set as an origin. The part ID "4" retrieves the document managing table 420 through the document managing portion 402, and shows the receiving date and time of the received document ID. Then, there is shown the character string image, which is printed in the range from the position (500, 600) to the position (200 100) when the upper left portion of the report sheet is set as an origin. In this way, the report sheet image of each of all parts of a certain report sheet ID is generated (step ST18). Thereafter, the report sheet issuing portion 406 instructs the printing portion 403 to print the report sheet image, and the report sheet portion 403 executes the printing of the report sheet (step S19). If the printing of the report sheet is finished, the operation goes to step 23.

If no error is detected in step S13, document data of n copy and p page is read, and printed by the printing portion 403 (step S20). Thereafter, n or p is incremented or initialized in accordance with the printing instruction (step S21). Then, the whole copies of the documents and the whole pages are printed (step S13, steps S20 to S22). After finishing the printing (step S22), the operation goes to step 23.

If the issue of the report sheet or the printing of the document is finished in step S23, the document managing portion 402 deletes the above document managing data from the document managing table 420. Thereby, a series of processing of one document data is finished. This processing is repeated with respect to each document data. If document managing data, which is waiting for execution, is still in the document managing table, the document ID is obtained and the printing processing of the document is started in the same manner as the above (steps S11 to S23).

Figure 21:
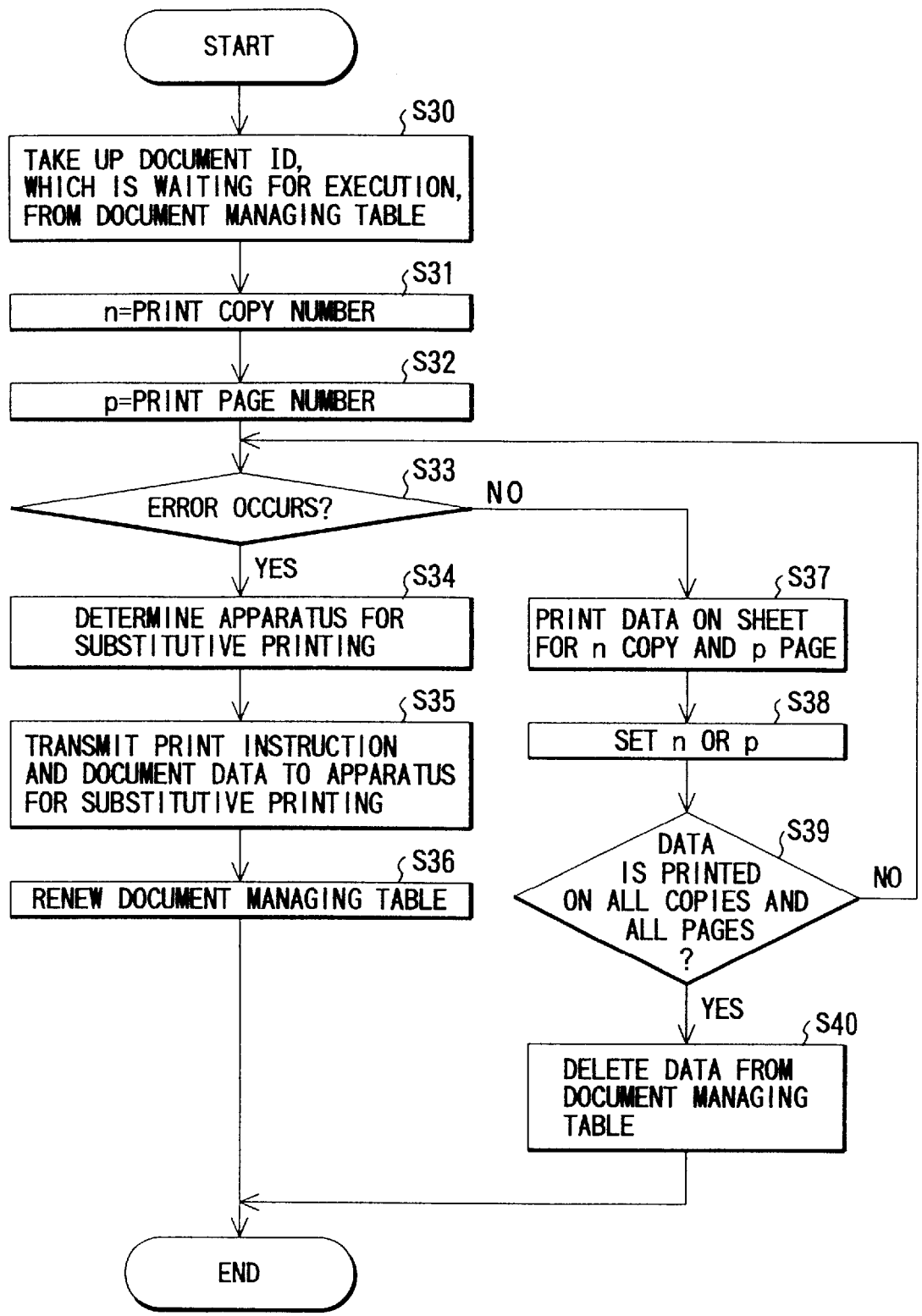
FIG. 21 is a flow chart explaining the other processing operation when the error is detected during the printing of document data, and showing a case of requesting the other printing apparatus to execute a substitutive printing, so that no report sheet is issued.
Figure 22:
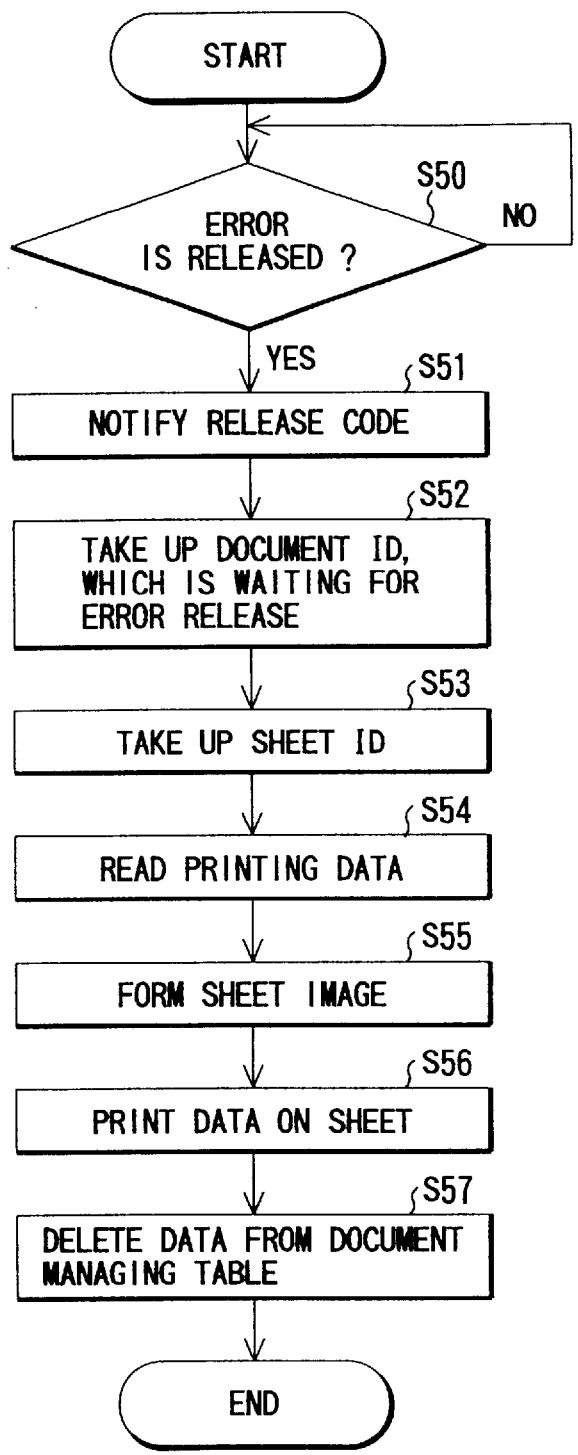
FIG. 22 is a flow chart explaining the other processing operation when the error is detected during the printing of document data, and showing a case in which a predetermined report sheet is issued when the error is corrected after requesting the other printing apparatus to execute a substitutive printing.

FIGS. 21 and 22 are flow charts explaining the processing in a case where the other error is detected during the printing of document data.

The flow charts of FIGS. 21 and 22 show the operation of the case in which data of requesting the substitutive printing cannot be printed on the report sheet as in the case when the error such as paper jam is detected by the error detection portion 404. In the case where data cannot be immediately printed on the report sheet, data is printed on a predetermined report sheet when the error is corrected after requesting the substitutive printing by the other printable apparatus.

First, in step S30 of FIG. 21, the document managing portion 402 takes up the document ID whose execution state item is "waiting for execution" from the document managing table 420 (step S10). Then, the value of the print copy number item is set to parameter n for printing (step S31). The value of the print page number item is set to parameter p for printing (step S32). The printing for n copy and p page is started.

If the printing is started, the error detection portion 404 checks whether or not an error occurs with reference to the error detecting table 421 (step S33). Specifically, the error detection portion 404 compares the performing state with the error value in each check item of FIG. 13. If the performing state is the error value or less, the error detection portion 404 judges that the error occurs, and notifies the error processing portion 405 of the corresponding error code. For example, if the performing state of the check item "paper jam" is the error value "0", the error detection portion 404 notifies error code "E002" to the error processing portion 405 together with the document ID.

The error processing portion 405 judges the substitutive printing based on the received error code from the error processing determining table 422 if the corresponding error processing content item is "substitutive printing." For example, "NULL" is set to the report sheet issuing item of the table 422 when the error processing portion 405 receives the error code "E002." Therefore, the error processing portion 405 judges that the report sheet is not issued. Then, the error processing portion 405 judges that the apparatus whose performing state item is "waiting" or "executing" is printable with reference to table 423. Such the apparatus is determined as an apparatus, which performs the substitutive printing (step S34). In the printing apparatus managing table 423 of FIG. 15, for example, it can be understood that apparatus ID "2" is printable.

Thereafter, a print instruction command and document data of the designated document ID (after n copy and p page) are transmitted to the apparatus address of the determined apparatus (step S35). For example, if the apparatus, which performs the substitutive printing, is the apparatus ID "2", the print instruction command and document data are transmitted to the apparatus address "222.222.222.22", and the document managing portion 402 renews the document managing table 420 (step S36). In other words, for example, "occurrence of error" is stored in the execution state item of the document managing table 420.

If no error is detected by the error detection portion 404 in step S33, document data for n copy and p page is read, and printed by the printing portion 403 (step S37). Thereafter, n or p is incremented or initialized in accordance with the printing instruction (step S38). Then, the whole copies of the documents and the whole pages are printed (step S33, steps S37 to S39). After finishing the printing (step S39), the document managing portion 402 deletes the above document managing data from the document managing table 420 (step S40). If document managing data, which is waiting for execution, is still in the document managing table, the document ID is obtained and the printing processing of the document is performed in the same manner as the above (steps S30 to S40).

FIG. 22 is a flow chart showing the processing after a predetermined treatment against the error is provided by the user. For example, if the treatment against the paper jam is provided by the user and the error is error is released (step S50), the error detection portion 404 detects the release of the error, and notifies the release code to the error processing portion 405 (step S51). In this case, when the error state is changed from (current performing state)≦(error value) to (current performing state)>(error value), the error detection portion 404 judges that the error is released, and notifies the corresponding release code to the error notifying portion 5. For example, when the performing state, "0" showing "paper jam" is changed to "1", the error detection portion 404 judges that the error of "paper jam" is released, and notifies release code "R002" to the error processing portion 405.

The error processing portion 405 receives the release code, and obtains a document ID (having an error being generated) through the document managing portion 402 with reference to the table 420 (step S52). In this case, the document ID is waiting for an error release corresponding to the received release code. For issuing the report sheet, the error processing portion 405 obtains the report sheet ID (step S53), and designates the document ID and the report sheet ID. Then, the error processing portion 405 notifies the report sheet issuing portion 406 to issue the report sheet. For example, if the error processing portion 405 receives release code "R002" from the error detection portion 404, the error processing portion 405 obtains the document ID "2", which is waiting for error release of release code "R002, with reference to table 420. Then, since the report sheet issuing item of code "R002" is set to "existence", the error processing portion 405 obtains the corresponding report sheet ID "3" and designates the document ID"2" and the report sheet ID "3". Then, the error processing portion 405 notifies the report sheet issuing portion 406 to issue the report sheet.

The report sheet issuing portion 406 receives the report sheet ID and the document ID from the error processing portion 405, and reads the corresponding report sheet printing data with reference to the report sheet managing table 425 (step S54), thereby forming a report sheet image (step S55). Then, the report sheet issuing portion 406 instructs the printing portion 403 to print the report sheet image, and the printing portion 403 executes the printing of the report sheet (step S56).

After finishing the issue of the report sheet, the error processing portion 405 deletes document managing data from the document managing table 420 through the document managing portion 402 if the processing content of table 422 is "deletion of document" (step S57).

Figure 23:
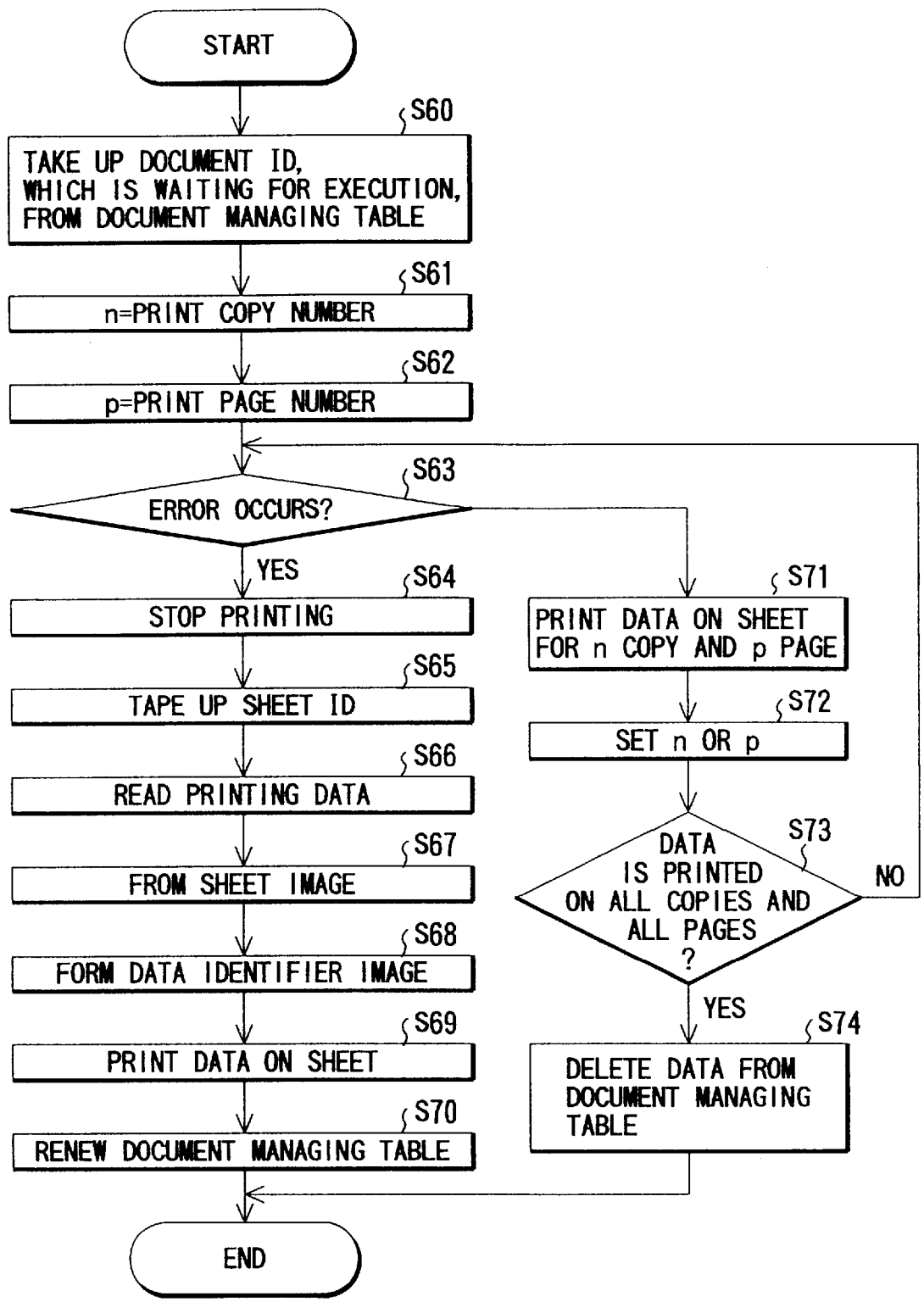
FIG. 23 is a flow chart explaining the other processing operation when the error is detected during the printing of document data, and showing a case in which the user selects a desired print apparatus so as to execute the continuation of printing.
Figure 24:
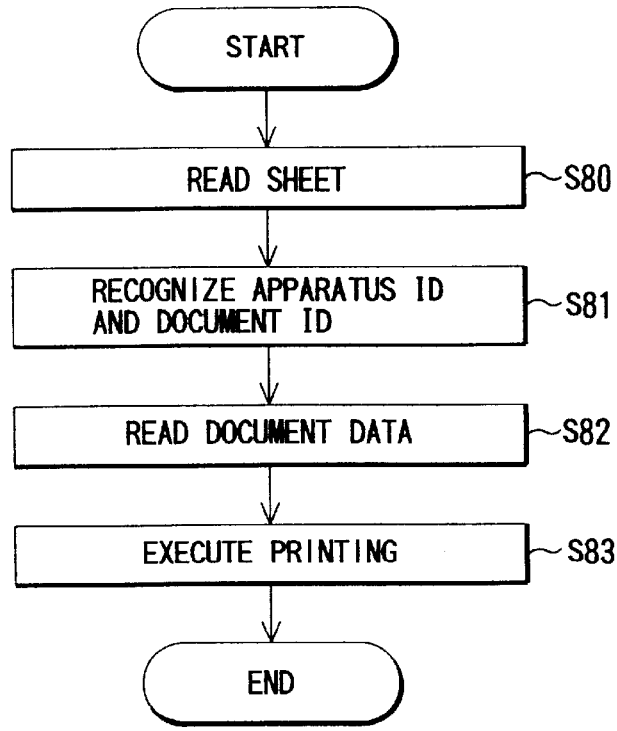
FIG. 24 is a flow chart explaining the other processing operation when the error is detected during the printing of document data, and showing a case in which the user selects a desired print apparatus so as to execute the continuation of printing.
Figure 25:
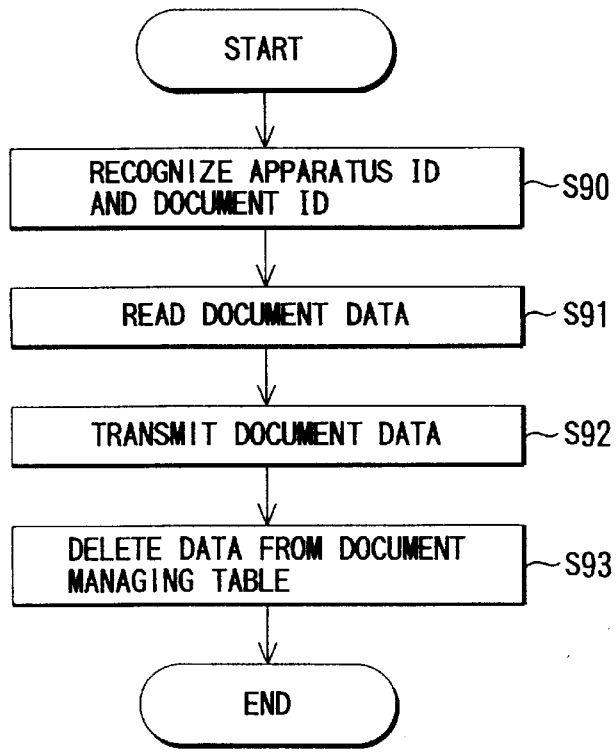
FIG. 25 is a flow chart explaining a process of renewing the document managing table by he apparatus having an error generated in a case where the error is detected during the printing of document data and the user selects a desired print apparatus so as to execute the continuation of printing.

FIGS. 23 to 25 are flow charts each explaining the other operation when the error is detected during the printing of document data. The following will explain the case in which the user selects a desired printing apparatus to execute the continuation of the printing when the error is detected during the printing of document data.

First, in step S60 of FIG. 23, the document managing portion 402 takes up the document ID whose execution state item is "waiting for execution" from the document managing table 420. Then, the value of the print copy number item is set to parameter n for printing (step S61). The value of the print page number item is set to parameter p for printing (step S62). The printing for n copy and p page is started.

If the printing is started, the error detection portion 404 checks whether or not an error occurs with reference to the error detecting table 421 (step S63). Then, if an error occurs, the error detection portion 404 notifies the corresponding error code to the error processing portion 405 together with the document ID. For example, if the number of needles of the stapler is below "0", the error detection portion 404 notifies error code "E003" to the error processing portion 405.

The error processing portion 405 receives the error code, and stops the printing based on the error code when the error processing content item of table 422 is "stop printing" (step 64). Then, if the report sheet issuing item, which corresponds to the received error code, is "existence", the error processing portion 405 takes up the report sheet ID from the report sheet ID item (step S65), designates the report sheet ID and the document ID. Then, the error processing portion 405 requests the report sheet issuing portion 406 to issue the report sheet. For example, if the error processing portion 405 receives the document ID"3" and the error code "E003", the error processing portion 405 stops the printing since the processing content is "stop printing". Then, the error processing portion 405 reads the corresponding report sheet ID "2", designates the document ID"3" and the report sheet ID"2", and requests the report sheet issuing portion 406 to issue the report sheet.

The report sheet issuing portion 406 receives the report sheet ID and the document ID from the error processing portion 405. Then, the report sheet issuing portion 406 reads each part data from the report sheet printing table 426, which is designated by the pointer of the report sheet managing table 425 (step S66), thereby forming a report sheet image (step S67). Then, if the document ID printing item of table 425 is "existence", an image of identification data is formed at a predetermined position on the report sheet image by use of a predetermined format, e.g., a bar code, an OCR character string, etc. (step S68). The image of identification data is formed of the received document ID and the apparatus ID allocated to the printing apparatus. Moreover, the report sheet issuing portion 406 requests the printing portion 403 to print the formed image. Then, the printing portion 403 executes the printing (step S69).

If the printing of the report sheet is finished, the error processing portion 405 renews the document managing table 420 to reflect the current printing state on the document managing table 420 through the document managing portion 402 (step S70). In this case, the error processing portion 405 requests the document managing portion 402 such that the print copy number item, the print page number item, the execution state, the release code item are set to the current n, the current p", "waiting for error release", and received release code, respectively. Then, the document managing portion 402 renews the document managing table.

If no error is detected by the error detection portion 404 in step S63, document data for n copy and p page is read, and printed by the printing portion 403 (step S71). Thereafter, n or p is incremented or initialized in accordance with the printing instruction (step S72). Then, the whole copies of the documents and the whole pages are printed (steps S71 to S73). After finishing the printing (step S73), the above document is deleted from the document managing table (step S74). If document managing data, which is waiting for execution, is still in the document managing table, the document ID is obtained and the printing processing of the document is performed in the same manner as the above (steps S60 to S74).

After receiving the report sheet printed in step S69 of FIG. 23, the printing of residual document data is executed by a user's desired printing apparatus. FIG. 24 is a flow chart showing an operation of the desired printing apparatus or an operation of DPPC.

In step S80, the reading portion 407 reads image data of the inserted report sheet. The report sheet recognizing portion 408 recognizes a data identifier, which is printed at a predetermined position on the report sheet based on image data read by the reading portion 407. Then, the report sheet recognizing portion 408 specifies the apparatus ID and the document ID (step S81). Data identifier (e.g., bar code) is printed by a predetermined format, and the report sheet recognizing portion 408 has a recognizing function in accordance with the format. Then, the report sheet recognizing portion 408 notifies the error processing portion 405 of the specified apparatus ID and document ID.

The error processing portion 405 receives the apparatus ID and the document ID, and obtains the corresponding apparatus address from the printing apparatus managing table 423. Then, the error processing portion 405 requests the apparatus to transmit data of the received document ID so as to receive document data (step S82). For example, if the error processing portion 405 receives the apparatus ID "1" and the document ID "2", the error processing portion 405 obtains the apparatus address "111.111.111.11", and transmits a command to the apparatus "1" to send document data of the document ID "2." Thereby, the error processing portion 405 receives document data of the document ID "2" from the apparatus "1." Thereafter, the printing is executed by the printing portion 403 (step S83). FIG. 25 is a flow chart showing an operation of an printing apparatus for maintaining document data. Specifically, if the communication portion 401 receives a document data request command transmitted from the other printing apparatus (step S90), the communication portion 401 notifies the document ID instructed by the document data request command to the document managing portion 402.

The document managing portion 402 reads document data when the execution state item of table 420 of the received document ID is "error is generating" (step S91). The document managing portion 402 transmits document data to the printing apparatus, which originally requests document data, through the communication portion 401 (step S92). Then, document managing data is deleted from the document managing table (step S93).

Figure 26:
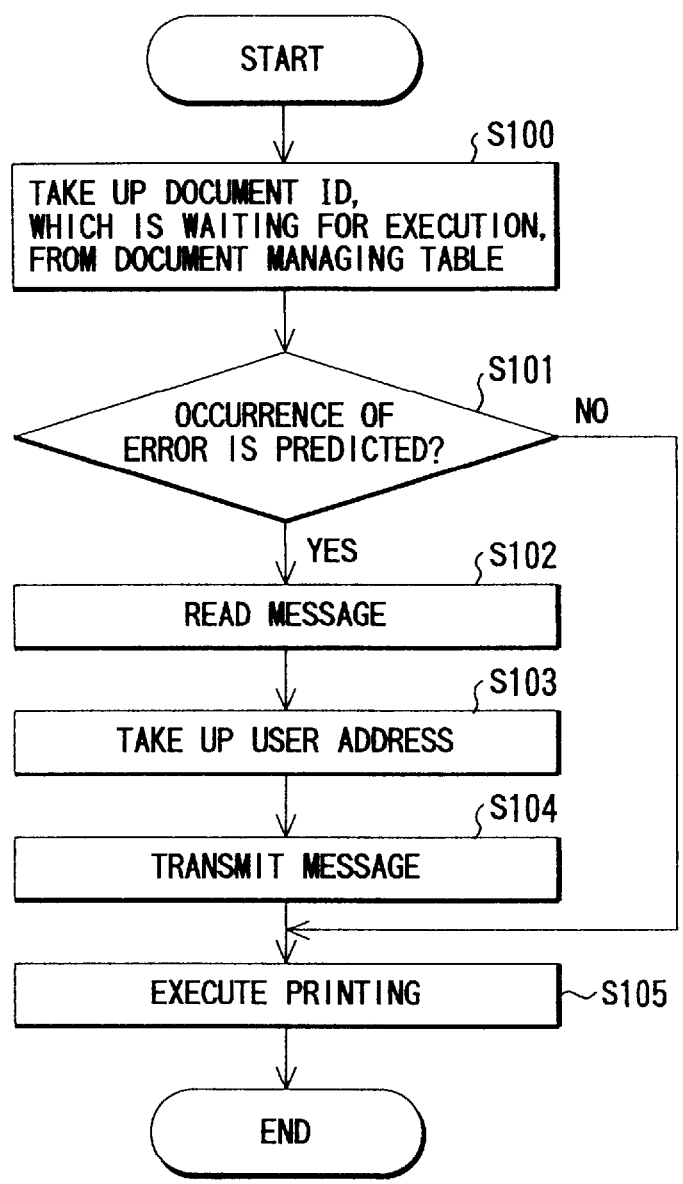
FIG. 26 is a flow chart explaining a process operation in a case where an occurrence of an error is predicted so as to inform an caution message in executing the print process of document data.

FIG. 26 is a flow chart explaining an operation of a case in which the occurrence of the error is predicted and an caution is notified in printing document data.

In FIG. 26, the document managing portion 402 takes up the document ID whose execution state item is "waiting for execution" from the document managing table 420 (step S100).

The error detection portion 404 predicts whether or not an error occurs (step S101). Specifically, the error detection portion 404 checks whether or not the performing state of each check item is below an caution value with reference to the error detecting table 421. If the performing state is below the caution value, the error detection portion 404 predicts that the error occurs, and notifies the error processing portion 405 of an caution code together with the document ID. For example, if the error detection portion 404 receives the document ID "4" from the document managing portion 402 and the performing state of the check item "number of papers" is less than the number of pages of the document ID "4", the following operation is performed.

Specifically, the error detection portion 404 notifies the caution code "W001" to the error processing portion 405 together with the document ID "4." The error processing portion 405 receives the document ID and the caution code, and obtains the processing content, which corresponds to the caution code, with reference to table 422. If the processing content is "notification to user", the error processing portion 405 obtains the message ID from the message ID item. Then, the error processing portion 405 obtains a message characteristic string to be notified the user from the message managing table 424 (step S102). For example, if the error processing portion 405 receives the document ID 141 and the caution code "W001", the processing content is "notification to user" from table 422. Therefore, the error processing portion 405 obtains message ID "1" from the message ID item. Then, from the message managing table 424, the error processing portion 405 obtains message data corresponding to the message ID "1."

The error processing portion 405 obtains the receiving date and time "95.08.08 17:00" of the document ID "4" from the document managing table 420. Then, the error processing portion 405 substitutes the obtained receiving date and time for the variable of message data, for example, "α receiving date and time." Next, the error processing portion 405 obtains the user address, which corresponds to the received document ID, with reference to the document managing table 420 (step S103), and transmits the message character string to the address (step S104). For example, if the error processing portion 405 receives the document ID "4", the error processing portion 405 obtains the user address "2" of the document ID "4" with reference to the document managing table, and transmits message data to the address. Then, the printing of each document is started (step S105). If there is no error to be predicted in step S101, the printing of each document is immediately started.

As explained above, according to the present invention, there can be provided a print processing method, which can improve convenience to a user and efficiency of print processing when an error occurs during a print processing and the printing is executed by a substitutive printing apparatus, and its print processing apparatus.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A print processing method for print-processing on a basis of print image data and print instruction data related to the print image data transferred from a terminal in a system comprising a plurality of printing apparatus connected to each other to be communicable with said terminal through a communication network, said method comprising:

a receiving step of receiving said print instruction data and said print image data;

a print-processing step of executing print-processing of said print image data by use of a first Printing apparatus connected to the communication network in accordance with said print instruction data received by said receiving step;

a detecting step of detecting an error at the time of executing the print-processing in said first printing apparatus;

a determining step of determining a substitutive printing by use of a second printing apparatus connected to the first printing apparatus through the communication network when the error is detected by said error detection step;

a notifying step of notifying the substitutive print-processing to said second printing apparatus determined by said determining step; and an issuing step of issuing a report sheet, on which data of the substitutive print-processing notified by said notifying step is printed, at the first printing apparatus.

2. The method according to claim 1, further comprising:

storing step of storing said print image data received by said receiving step to a memory; and a preparing step of preparing a document managing table for managing a document managing data including a current execution state, and a substitutive printing apparatus ID when the substitutive printing is designated wherein said detecting step includes a renewing step of renewing the content of said current execution state of said document managing table in accordance with the content of the error; and said a notifying step includes recording step of recording an apparatus ID of the second printing apparatus for a substitutive printing to said substitutive printing apparatus ID of said document managing table.

3. The method according to claim 1, wherein said detecting step includes an error judging step, and said error judging step refers to an error detecting table storing a current performing state and an error value, each of said current performing state and said error value corresponding to each of a plurality of checking items, and judges that an error of a corresponding checking item occurs when said current performing state is less than said error value.

4. The method according to claim 3, wherein said error detecting table stores error codes corresponding to said plurality of checking items respectively;

said detecting step includes an error code providing step, when an error occurs, said error code providing step provides an error code corresponding to said error; and said determining step includes an error processing judging step which refers to an error processing determining table storing an error processing content corresponding to each of the plurality of error codes, and judges an error processing corresponding to the provided error code.

5. The method according to claim 3, wherein said error detecting table stores an error code corresponding to each of said plurality of checking items;

said detecting step includes an error code providing step, when an error occurs, said error code providing step provides an error code corresponding to said error;

said determining step includes a report sheet ID judging step which refers to the error processing determining table storing an error processing content and a report sheet ID corresponding to each of the plurality of error codes, and judges a report sheet ID corresponding to the provided error code; and said issuing step includes a report sheet image printing step which refers to a report sheet image table storing report sheet image data corresponding to each of a plurality of report sheet IDs, and prints a report sheet image corresponding to the judged report sheet ID.

6. The method according to claim 1, wherein said determining step includes a step of judging a substitutable printing apparatus, which refers to a printing apparatus managing table storing an apparatus address of each apparatus and each current performing state corresponding to an apparatus ID of each of the plurality of printing apparatus connected to each other through said communication network.

7. The method according to claim 1, wherein said issuing step includes a step of printing a bar code including an apparatus ID of the first printing apparatus in which an error occurred and a document ID, and said second printing apparatus desired by user optically reads said bar code, and inputs residual print image data from the first printing apparatus so as to print said residual print data.

8. A print processing method for print-processing on a basis of print image data and print instruction data related to the print image data transferred from a terminal in a system comprising a plurality of printing apparatus connected to each other to be communicable with said terminal, through a communication network, said method comprising:

a receiving step of receiving said print instruction data and said print image data;

a storing step of storing said print image data received by said receiving step to a memory;

a preparing step of preparing a document managing table for managing document managing data including a document ID of each stored pint image data, a storage address thereof, a receiving data and time, a user ID of a user requesting the print processing, a current execution state, and a substitutive printing apparatus ID when the substitutive printing is designated;

a print-processing step of executing print-processing of said print image data by use of a first printing apparatus connected to the communication network in accordance with said print instruction data received by said receiving step and said document managing table;

a detecting step of detecting an error at the time of executing the print-processing in said first printing apparatus;

a determining step of determining a substitutive printing by use of a second printing apparatus connected to the first printing apparatus through the communication network when the error is detected by said error detection step;

a notifying step of notifying the substitutive print-processing to said second printing apparatus determined by said determining step; and an issuing step of issuing a report sheet on which data of the substitutive print-processing notified by said notifying step is printed at the first printing apparatus when said error is released.

9. A print processing method for print-processing on a basis of print image data and print instruction data related to the print image data transferred from a terminal in a system comprising a plurality of printing apparatus connected to each other to be communicable with said terminal through a communication network, said method comprising:

a receiving step of receiving said print instruction data and said print image data;

a print-processing step of executing print-processing of said print image data by use of a first printing apparatus connected to the communication network in accordance with said print instruction data received by said receiving step;

a predicting step of predicting an error at the time of executing the print-processing in said first printing apparatus, wherein said predicting step includes an error judging step which refers to an error detecting table storing a current performing state and a caution value, each corresponding to each of a plurality of checking items, and judges that an error of a corresponding checking item occurs when said current performing state is less than said caution value; and a notifying step of notifying a message to said terminal which has transmitted said print instruction data, when the error is predicted by said predicting step.

10. The method according to claim 9, wherein said notifying step includes a step of preparing a message with reference to a message managing table storing a message corresponding to each of a plurality of errors to be predicted.

11. A print processing method for print-processing on a basis of print image data and print instruction data related to the print image data transferred from a terminal in a system comprising a plurality of printing apparatus connected to each other to be communicable with said terminal through a communication network, said method comprising:

a receiving step of receiving said print instruction data and said print image data;

a first print-processing step of executing print-processing of said print image data by use of a first printing apparatus connected to the communication network in accordance with said print instruction data received by said receiving step;

a detecting step of detecting an error at the time of executing the print-processing in said first printing apparatus;

a storing step of storing a residual print image data whose print-processing is unfinished at the time when the error is detected by said error detecting step;

an issuing step of issuing a report sheet on which data specifying print image data stored in said storing step is printed at the first printing apparatus when said error is released;

a report sheet reading step of reading a content of the report sheet issued by the first printing apparatus in said report sheet issuing step;

a reading step of reading print image data stored in said storing step based on data read in said report sheet reading step when the report sheet is read in the report sheet reading step; and a second print-processing step of executing print-processing based on said print image data read in said reading step by use of a second printing apparatus connected to the first printing apparatus through the communication network.

\* \* \* \* \*